(12) United States Patent
Hong

(10) Patent No.: US 11,458,884 B2
(45) Date of Patent: Oct. 4, 2022

(54) HEADLIGHT CONTROL APPARATUS TO CONTROL THE LIGHTING ANGLE BASED ON ACQUIRED LATERAL AND LONGITUDINAL LINE DIFFERENCE

(71) Applicant: TOYOTA JIDOSHA KABUSHIKI KAISHA, Toyota (JP)

(72) Inventor: Michael Shin Hong, Nagoya (JP)

(73) Assignee: TOYOTA JIDOSHA KABUSHIKA KAISHA, Toyoto (JP)

( * ) Notice: Subject to any disclaimer, the term of this patent is extended or adjusted under 35 U.S.C. 154(b) by 0 days.

(21) Appl. No.: 17/496,380

(22) Filed: Oct. 7, 2021

(65) Prior Publication Data
US 2022/0144161 A1 May 12, 2022

(30) Foreign Application Priority Data
Nov. 10, 2020 (JP) .............................. JP2020-187112

(51) Int. Cl.
| | |
|---|---|
| *B60Q 1/14* | (2006.01) |
| *B60Q 1/08* | (2006.01) |
| *B60Q 1/068* | (2006.01) |
| *G06V 20/58* | (2022.01) |
| *B60Q 1/00* | (2006.01) |

(52) U.S. Cl.
CPC ............. *B60Q 1/143* (2013.01); *B60Q 1/068* (2013.01); *B60Q 1/085* (2013.01); *G06V 20/584* (2022.01); *B60Q 1/0023* (2013.01); *B60Q 2300/41* (2013.01)

(58) Field of Classification Search
CPC ...... B60Q 1/143; B60Q 1/068; B60Q 1/0023; B60Q 2300/41; G06V 20/584
See application file for complete search history.

(56) References Cited

U.S. PATENT DOCUMENTS
2019/0225139 A1* 7/2019 Kambara ............... B60Q 1/143

FOREIGN PATENT DOCUMENTS
| | | |
|---|---|---|
| JP | 2007-045407 A | 2/2007 |
| WO | 01/70538 A2 | 9/2001 |

\* cited by examiner

*Primary Examiner* — Robert J May
(74) *Attorney, Agent, or Firm* — Sughrue Mion, PLLC

(57) ABSTRACT

A headlight control apparatus sets a forward moving vehicle as a target vehicle, acquire a target longitudinal difference between a reference lateral line in a forward image and a target vehicle lateral line which defines a position of the target vehicle in a longitudinal direction in the forward image, acquire a target lateral difference between a reference longitudinal line in the forward image and a target vehicle longitudinal line which defines a position of the target vehicle in the lateral direction in the forward image, set a target lighting angle of the at least one headlight, depending on the target longitudinal and lateral differences, and adjust the lighting angle of at least one headlight to the target lighting angle.

6 Claims, 17 Drawing Sheets

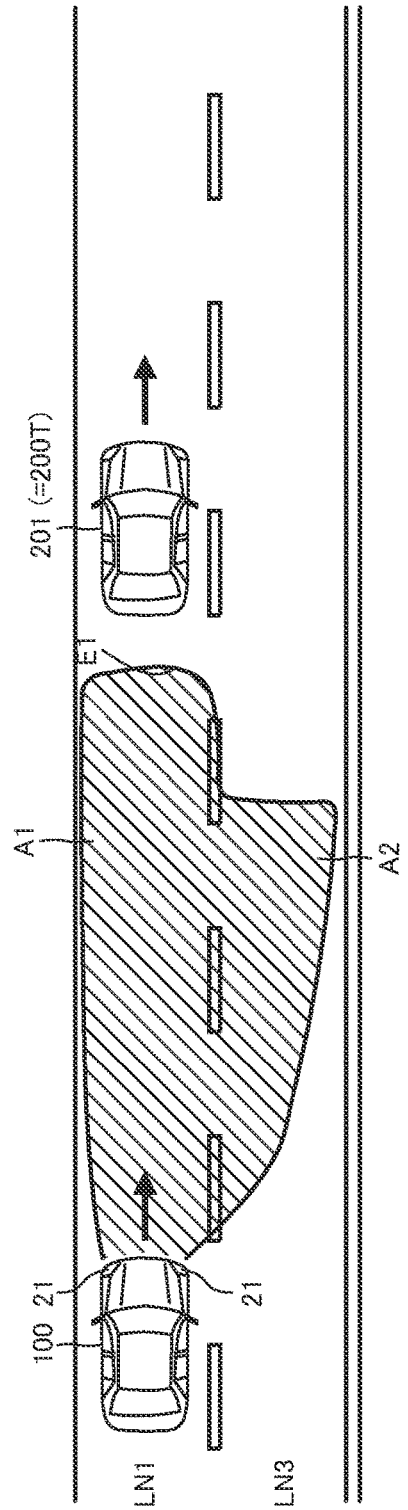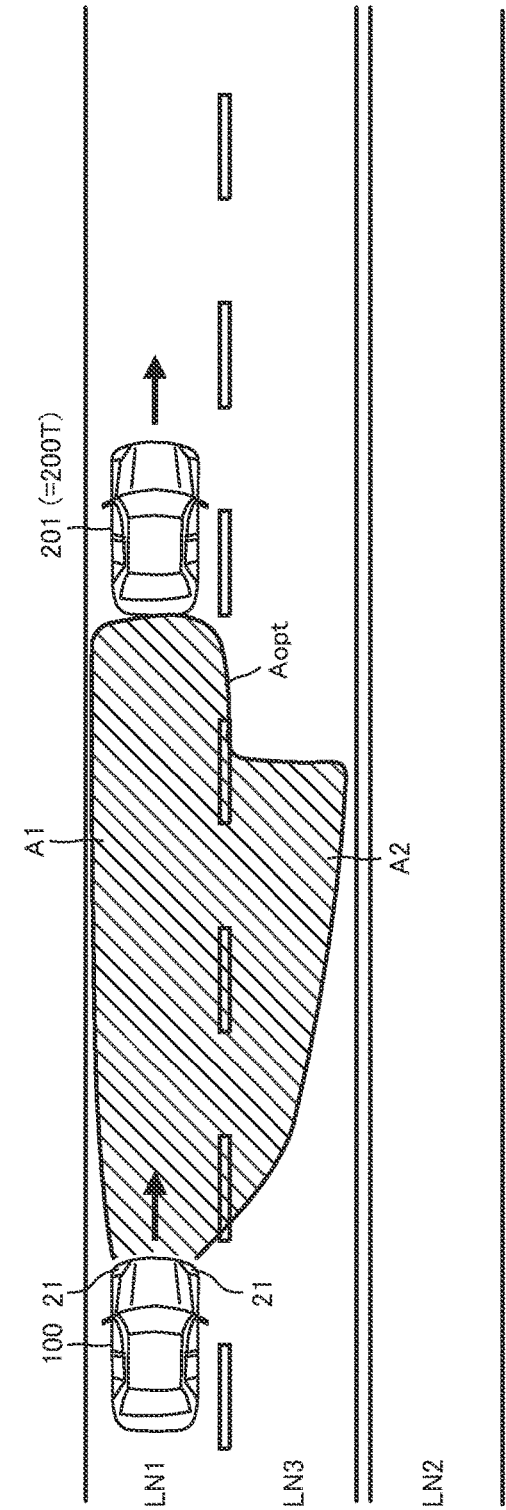
FIG.5A
FIG.5B

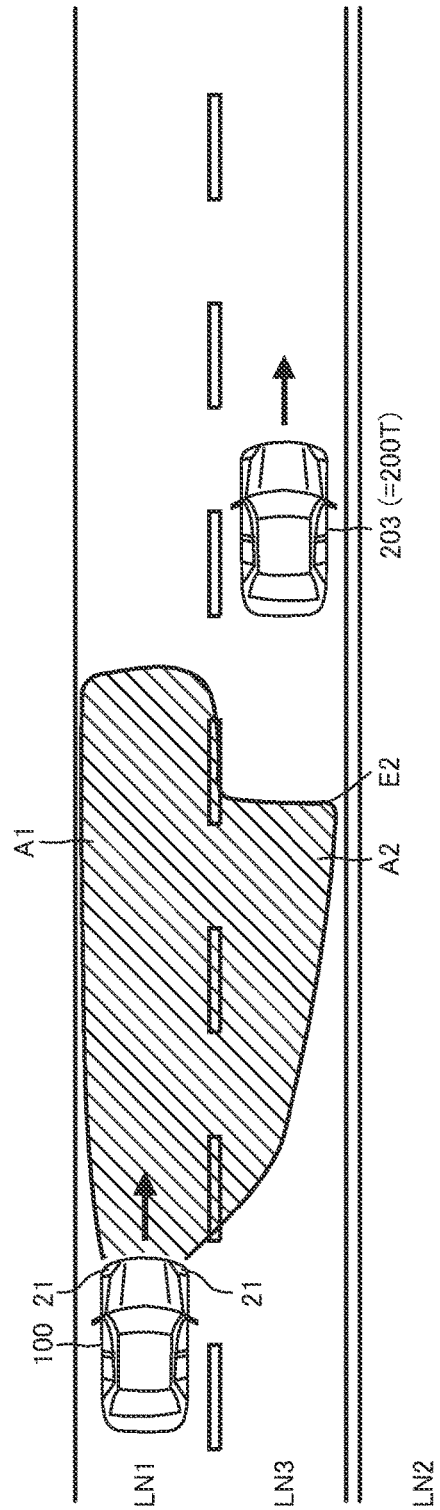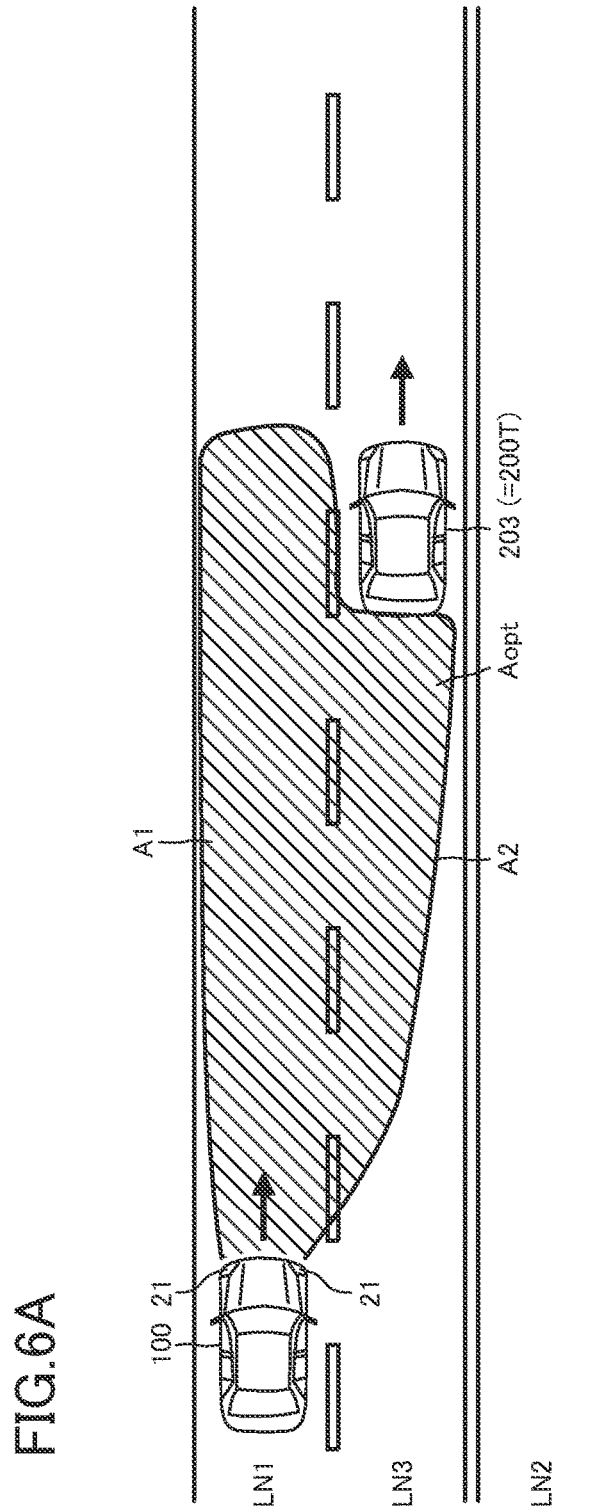

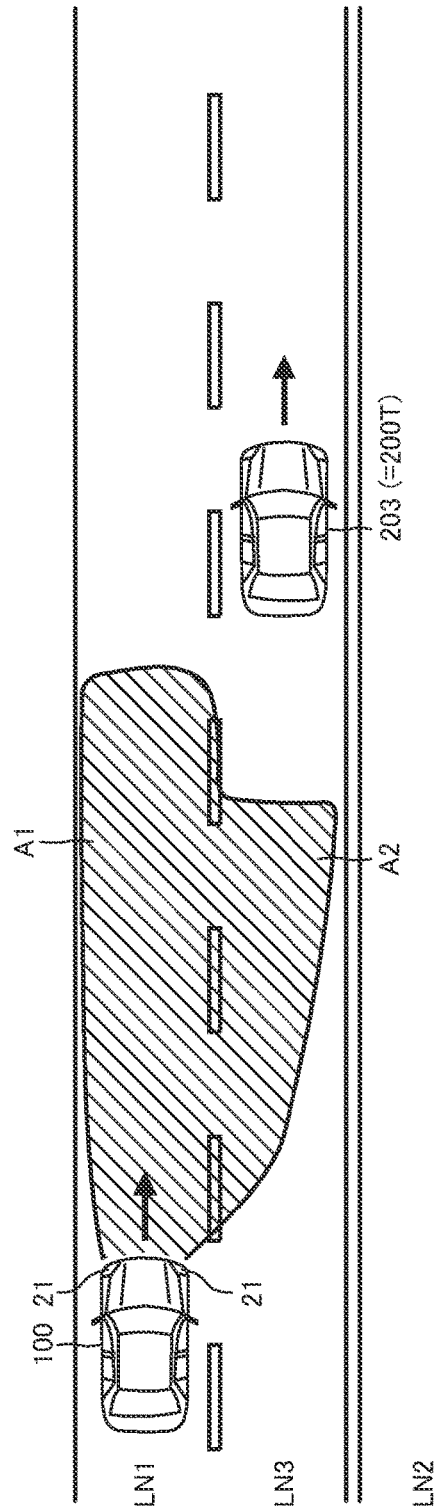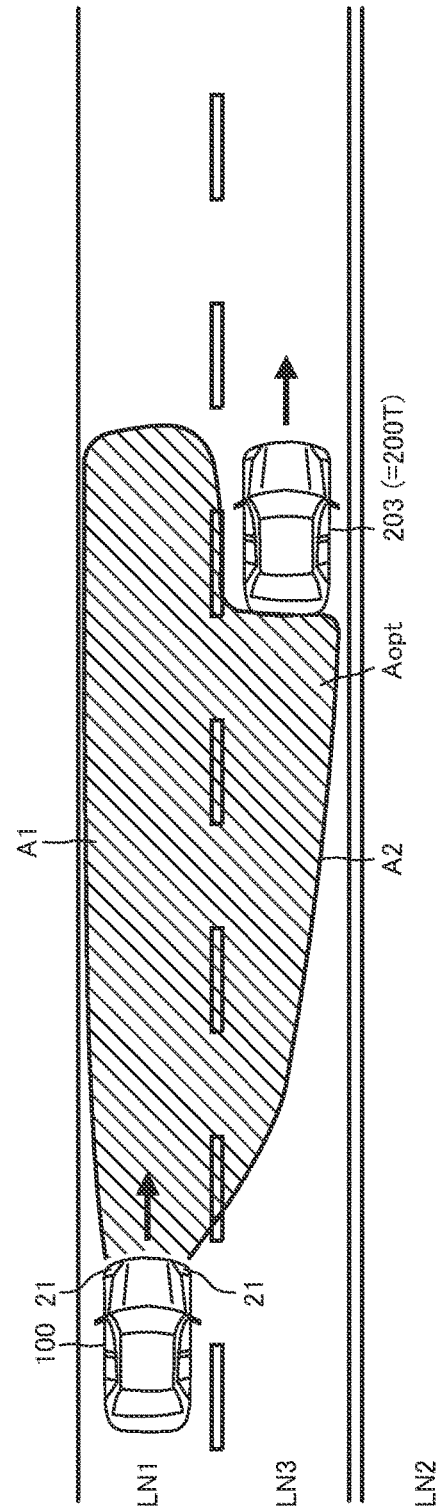
FIG.9A
FIG.9B

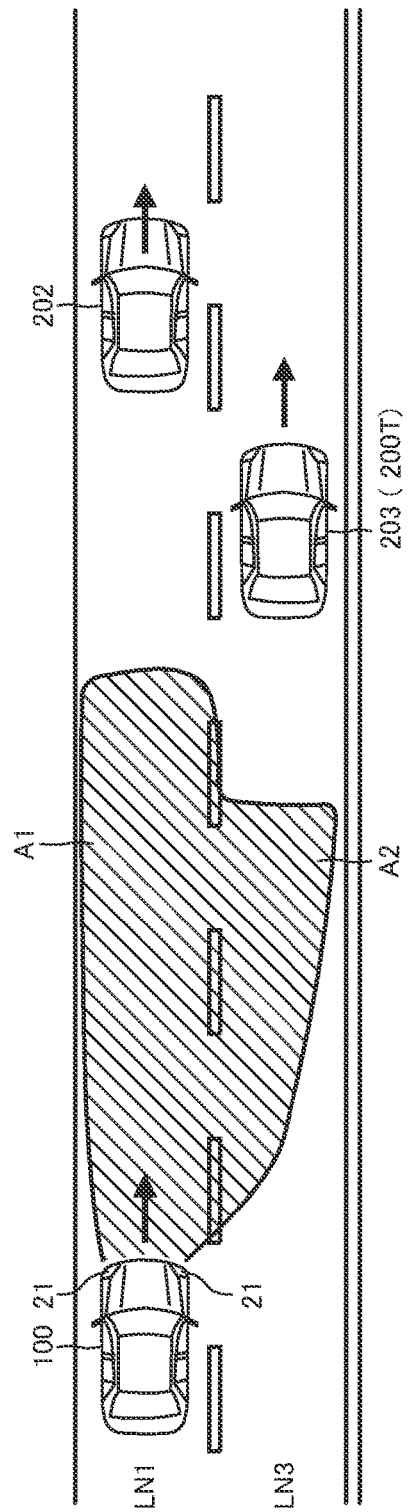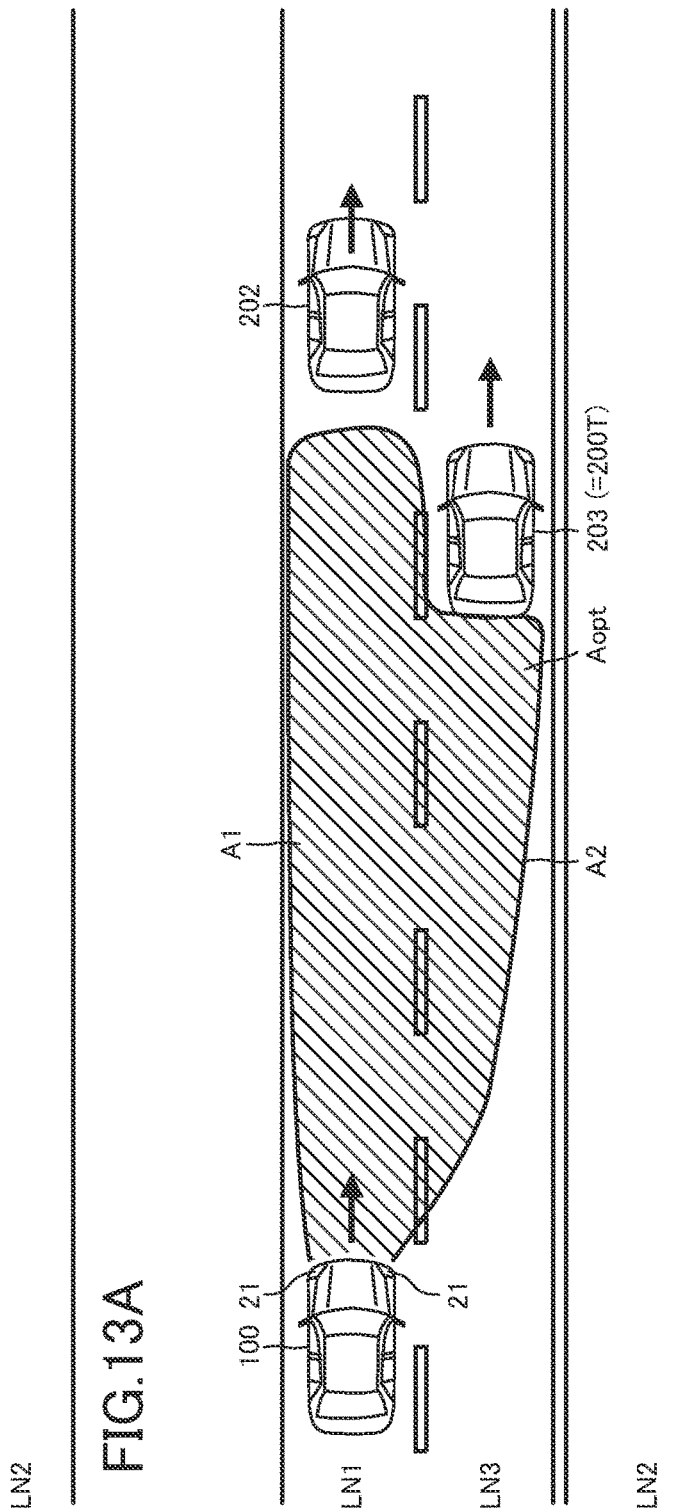
FIG.13A
FIG.13B

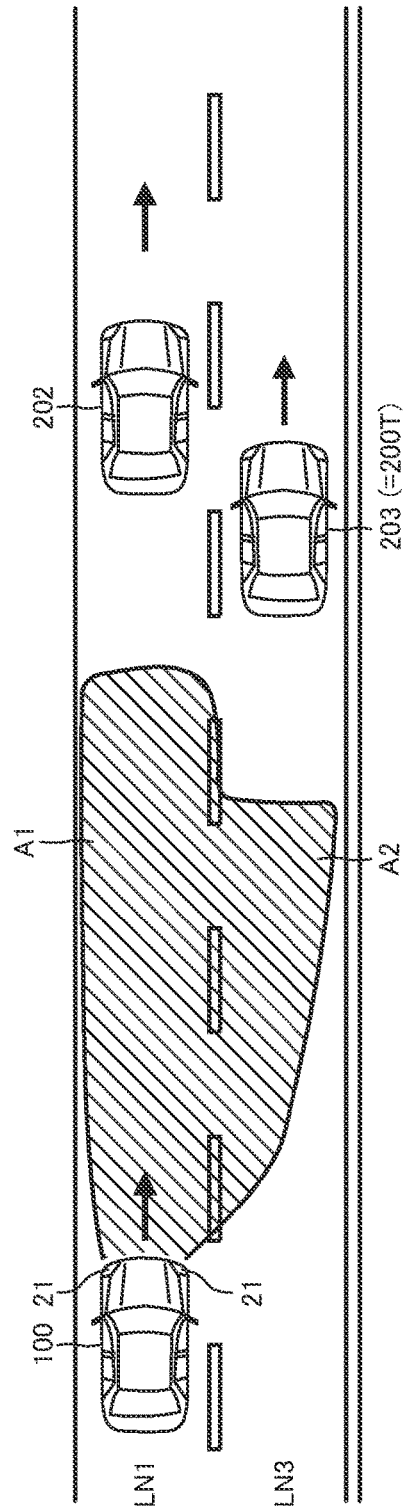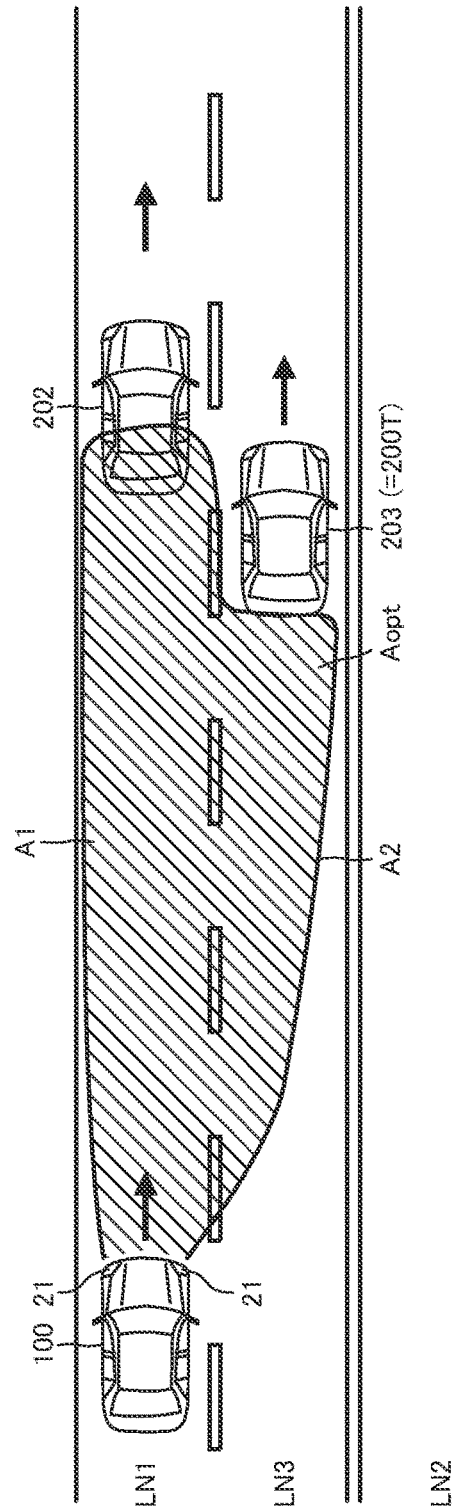

HEADLIGHT CONTROL APPARATUS TO CONTROL THE LIGHTING ANGLE BASED ON ACQUIRED LATERAL AND LONGITUDINAL LINE DIFFERENCE

BACKGROUND

Field

The invention relates to a headlight control apparatus.

Description of the Related Art

There is known a headlight device which changes lighting states of head lights, depending on whether there are a preceding vehicle and an oncoming vehicle, i.e., depending on a situation ahead of an own vehicle (for example, see JP 2007-45407 A). Also, there is known another headlight device in which lighting angles of the right and left headlights are different from each other in order to avoid dazzling a driver of the oncoming vehicle. In this known headlight device, the lighting angle of the headlight which lights the oncoming lane is set to an angle smaller than the lighting angle of the headlight which lights an own vehicle moving lane on which the own vehicle. Thereby, an area lighted by the headlight which lights the oncoming lane, is narrower than an area lighted by the headlight which lights the own vehicle moving lane.

A driver of the own vehicle can clearly see a view ahead of the own vehicle at night when the headlights light an area far forward from the own vehicle. In this regard, when (i) the headlights light the area far forward from the own vehicle, and (ii) there is another vehicle ahead of the own vehicle, a driver of the other vehicle (i.e., a forward moving vehicle) may be dazzled with the headlights and drive the vehicle with difficulty. Thus, the driver of the own vehicle has a benefit from setting the lighting angles of the headlights to greater angles, and the driver of the forward moving vehicle has a benefit from setting the lighting angles of the headlights to smaller angles.

SUMMARY

An object of the invention is to provide a headlight control apparatus which can light the area ahead of the own vehicle by the headlights to ensure a high visibility of the driver of the own vehicle to see the view ahead of the own vehicle with avoiding dazzling the driver of the forward moving vehicle.

A headlight control apparatus according to the invention comprises an electronic control unit and a forward image acquiring device. The electronic control unit executes a lighting angle control of adjusting a lighting angle of at least one headlight of an own vehicle. The forward image acquiring device which acquires a forward image which is an image of a view ahead of the own vehicle.

The electronic control unit executes a vehicle image detecting process of detecting an image of a forward moving vehicle ahead of the own vehicle from the forward image when the electronic control unit executes the lighting angle control. Further, when the electronic control unit detects the image of the forward moving vehicle by the vehicle image detecting process, the electronic control unit sets the forward moving vehicle identified by the detected image of the forward moving vehicle as a target vehicle which the lighting angle control targets.

Furthermore, the electronic control unit acquires a target longitudinal difference which corresponds to a length between a reference lateral line and a target vehicle lateral line. The reference lateral line is a reference line which extends in a lateral direction in the forward image. The target vehicle lateral line is a line which extends in the lateral direction in the forward image and defines a position of the target vehicle in a longitudinal direction in the forward image. Furthermore, the electronic control unit acquires a target lateral difference which corresponds to a length between a reference longitudinal line and a target vehicle longitudinal line. The reference longitudinal line is a reference line which extends in the longitudinal direction in the forward image. The target vehicle longitudinal line is a line which extends in the longitudinal direction in the forward image and defines a position of the target vehicle in the lateral direction in the forward image.

Furthermore, the electronic control unit sets a target lighting angle of the at least one headlight, depending on the acquired target longitudinal difference and the acquired target lateral difference. Furthermore the electronic control unit adjusts the lighting angle of the at least one headlight to the set target lighting angle.

Adjusting the lighting angle of the at least one headlight of the own vehicle, depending on the relationship in position between the own vehicle and the target vehicle, can avoid dazzling a driver of the target vehicle by light emitted from the at least one headlight of the own vehicle. In addition, adjusting the lighting angle of the at least one headlight of the own vehicle, depending on the relationship in position between the own vehicle and the target vehicle so as to light an area near the target vehicle by the at least one headlight, can ensure the high visibility of the driver of the own vehicle to see the view ahead of the own vehicle. The headlight control apparatus according to the invention adjusts the lighting angle of the at least one headlight of the own vehicle, depending on the target longitudinal difference and the target lateral difference which specify the relationship in position between the own vehicle and the target vehicle. Thus, the headlight control apparatus according to the invention can ensure the high visibility of the driver of the own vehicle to see the view ahead of the own vehicle with avoiding dazzling the driver of the target vehicle.

According to an aspect of the invention, when the electronic control unit detects the images of the forward moving vehicles from the forward image, the electronic control unit may set the forward moving vehicle closest to the own vehicle as the target vehicle among the forward moving vehicles identified by the images of the forward moving vehicle.

When there are the forward moving vehicles, adjusting the lighting angle of the at least one headlight of the own vehicle, depending on the position of the forward moving vehicle closest to the own vehicle, can avoid dazzling the drivers of all the forward moving vehicles. In addition, adjusting the lighting angle of the at least one headlight of the own vehicle to light an area near the forward moving vehicle closest to the own vehicle by the at least one headlight, depending on the position of the forward moving vehicle closest to the own vehicle, can avoid dazzling the drivers of all the forward moving vehicles. The headlight control apparatus according to this aspect of the invention sets the forward moving vehicle closest to the own vehicle as the target vehicle and adjusts the lighting angle of the at least one headlight of the own vehicle, depending on the target longitudinal difference and the target lateral difference regarding the target vehicle. Thus, the headlight control apparatus according to this aspect of the invention can ensure the high visibility of the driver of the own vehicle to see the view ahead of the own vehicle with avoiding dazzling the drivers of all the forward moving vehicles when there are the forward moving vehicles.

According to another aspect of the invention, when the electronic control unit does not detect the image of the forward moving vehicle, the electronic control unit may set a predetermined base lighting angle as the target lighting angle. Further, when the electronic control unit detects the image of the forward moving vehicle, and sets the target vehicle, the electronic control unit may (i) acquire a first angle to be added to the predetermined base lighting angle, based on the target longitudinal difference, (ii) acquire a second angle to be added to the predetermined base lighting angle, based on the target lateral difference, and (iii) set a value acquired by adding the first angle and the second angle to the predetermined base lighting angle as the target lighting angle.

When the predetermined base lighting angle has been prepared as the lighting angle of the at least one headlight of the own vehicle, setting the target lighting angle by correcting the predetermined base lighting angle, depending on the target longitudinal difference and the target lateral difference regarding the target vehicle and adjusting the lighting angle of the at least one headlight of the own vehicle to the target lighting angle, can surely avoid dazzling the driver of the target vehicle. The headlight control apparatus according to this aspect of the invention (i) sets the target lighting angle by correcting the predetermined base lighting angle by the first angle acquired, based on the target longitudinal difference regarding the target vehicle and the second angle acquired, based on the target lateral difference regarding the target vehicle, and (ii) adjusts the lighting angle of the at least one headlight of the own vehicle to the target lighting angle. Thus, the headlight control apparatus according to this aspect of the invention can ensure the high visibility of the driver of the own vehicle to see the view ahead of the own vehicle with surely avoiding dazzling the driver of the target vehicle.

According to further another aspect of the invention, the at least one headlight may include an oncoming lane area headlight which lights an area at an oncoming lane side and a forward area headlight which lights an area directly in front of the own vehicle. Further, the lighting angle of the oncoming lane area headlight may be smaller than the lighting angle of the forward area headlight by a predetermined angle. Furthermore, the electronic control unit may set the second angle to zero when the target vehicle is a vehicle moving in the area directly in front of the own vehicle. Furthermore, the electronic control unit may set the second angle to the predetermined angle when the target vehicle is a vehicle moving in the area at the oncoming lane side.

When (i) the lighting angle of the oncoming lane area headlight of the own vehicle is set to an angle smaller than the lighting angle of the forward area headlight of the own vehicle by the predetermined angle, and (ii) the target vehicle is a vehicle which moves in the area directly in front of the own vehicle, the target lighting angle which can ensure the high visibility of the driver of the own vehicle to see the view ahead of the own vehicle with avoiding dazzling the driver of the target vehicle, can be set with using the target longitudinal difference without using the predetermined angle. On the other hand, when the target vehicle is a vehicle which moves in the area at the oncoming lane side, the target lighting angle which can ensure the high visibility of the driver of the own vehicle to see the view ahead of the own vehicle with avoiding dazzling the driver of the target vehicle, cannot be set with using the target longitudinal difference without using the predetermined angle. The headlight control apparatus according to this aspect of the invention sets the second angle to zero when the target vehicle is a vehicle which moves in the area directly in front of the own vehicle. Thus, the target lighting angle is set without considering the predetermined angle. On the other hand, the headlight control apparatus according to this aspect of the invention sets the second angle to the predetermined angle when the target vehicle is a vehicle which moves in the area at the oncoming lane side. Thus, the target lighting angle is set with considering the predetermined angle. Thus, the headlight control apparatus according to this aspect of the invention can ensure the high visibility of the driver of the own vehicle to see the view ahead of the own vehicle with avoiding dazzling the driver of the target vehicle when the target vehicle is a vehicle which moves in the area directly in front of the own vehicle and when the target vehicle is a vehicle which moves in the area at the oncoming lane side.

According to further another aspect of the invention, when the target lateral difference represents the area directly in front of the own vehicle with respect to the reference longitudinal line, the electronic control unit may determine that the target vehicle is the vehicle moving in the area directly in front of the own vehicle. Further, when the target lateral difference represents the area at the oncoming lane side with respect to the reference longitudinal line, the electronic control unit may determine that the target vehicle is the vehicle moving in the area at the oncoming lane side.

When the target vehicle is a vehicle which moves in the area directly in front of the own vehicle, the target lateral difference takes a value which represents the area directly in front of the own vehicle with respect to the reference longitudinal line. On the other hand, when the target vehicle is a vehicle which moves in the area at the oncoming lane side, the target lateral difference takes a value which represents the area at the oncoming lane side with respect to the reference longitudinal line. The headlight control apparatus according to this aspect of the invention determines that the target vehicle is the vehicle which moves in the area directly in front of the own vehicle when the target lateral difference represents the area directly in front of the own vehicle with respect to the reference longitudinal line. On the other hand, the headlight control apparatus according to this aspect of the invention determines that the target vehicle is the vehicle which moves in the area at the oncoming lane side when the target lateral difference represents the area at the oncoming lane side with respect to the reference longitudinal line. Thereby, the headlight control apparatus can accurately determine whether the target vehicle is the vehicle which moves in the area directly in front of the own vehicle or at the oncoming lane side.

According to further another aspect of the invention, the reference lateral line may be a line which defines a position of a front edge of the area ahead of the own vehicle which the at least one headlight light with a predetermined base lighting angle.

Setting the target lighting angle, depending on a size of an area between the target vehicle and the front edge of the area ahead of the own vehicle which the at least one headlight lights, can ensure the high visibility of the driver of the own vehicle to see the view ahead of the own vehicle with avoiding dazzling the driver of the target vehicle. According to the headlight control apparatus according to this aspect of the invention, the reference lateral line is the line which defines the position of the front edge of the area ahead of the own vehicle which the at least one headlight lights with the predetermined base lighting angle. Thus, the target lighting angle is set, depending on the size of the area between the target vehicle and the front edge of the area ahead of the own vehicle which the at least one headlight lights. Thus, the headlight control apparatus according to this aspect of the invention can ensure the high visibility of the driver of the own vehicle to see the view ahead of the own vehicle with avoiding dazzling the driver of the target vehicle.

Elements of the invention are not limited to elements of embodiments and modified examples of the invention described along with the drawings. The other objects, features and accompanied advantages of the invention can be easily understood from the embodiments and the modified examples of the invention.

BRIEF DESCRIPTION OF THE DRAWINGS

FIG. 5A is a view which shows a scene that a preceding vehicle moves directly in front of the own vehicle installed with the headlight control apparatus according to the embodiment of the invention, and the low beam headlights of the own vehicle are lighted.

FIG. 5B is a view similar to FIG. 5A and which shows a scene that the low beam headlights light an optimum lighting area.

FIG. 6A is a view which shows a scene that a next lane vehicle moves ahead of the own vehicle installed with the headlight control apparatus according to the embodiment of the invention, and the low beam headlights of the own vehicle are lighted.

FIG. 6B is a view similar to FIG. 6A and which shows a scene that the low beam headlights light the optimum lighting area.

FIG. 9A is a view which shows a scene that the next lane vehicle moves ahead of the own vehicle installed with the headlight control apparatus according to the embodiment of the invention, and the low beam headlights of the own vehicle are lighted with the target lighting angle set to the base lighting angle.

FIG. 9B is a view similar to FIG. 9A and which shows a scene that the low beam headlights of the own vehicle are lighted with the target lighting angle set to an angle acquired by correcting the base lighting angle.

FIG. 13A is a view which shows a scene that the preceding vehicle and the next lane vehicle move ahead of the own vehicle installed with the headlight control apparatus according to the embodiment of the invention, and the low beam headlights of the own vehicle are lighted with the target lighting angle set to the base lighting angle.

FIG. 13B is a view similar to FIG. 13A and which shows a scene that the low beam headlights of the own vehicle are lighted with the target lighting angle set to an angle acquired by correcting the base lighting angle.

FIG. 17A is a view which shows a scene that the preceding vehicle and the next lane vehicle move ahead of the own vehicle installed with the headlight control apparatus according to the embodiment of the invention, and the low beam headlights of the own vehicle are lighted with the target lighting angle set to the base lighting angle.

FIG. 17B is a view similar to FIG. 17A and which shows a scene that the low beam headlights of the own vehicle are lighted with the target lighting angle set to an angle acquired by correcting the base lighting angle.

DESCRIPTION OF THE EMBODIMENTS

Figure 1:
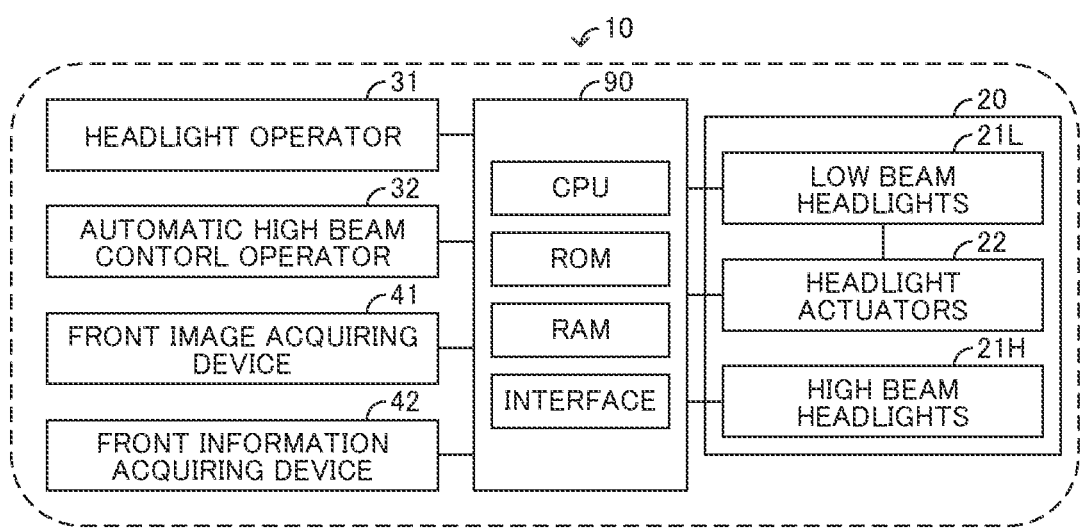
FIG. 1 is a view which shows a headlight control apparatus according to an embodiment of the invention.

Below, a headlight control apparatus according to an embodiment of the invention will be described with reference to the drawings. FIG. 1 shows the headlight control apparatus 10 according to the embodiment of the invention. The headlight control apparatus 10 is installed on an own vehicle 100 (see FIG. 2).

<ECU>

As shown in FIG. 1, the headlight control apparatus 10 includes an ECU 90. ECU stands for electronic control unit. The ECU 90 includes a micro-computer as a main component. The micro-computer includes a CPU, a ROM, a RAM, a non-volatile memory, and an interface. The CPU realizes various functions by executing instructions or programs or routines memorized in the ROM.

A headlight device 20, a headlight operator 31, an automatic high beam control operator 32, a forward image acquiring device 41, and a forward information acquiring device 42 are installed on the own vehicle 100.

<Headlight Device>

The headlight device 20 includes low beam headlights 21L, high beam headlights 21H, and headlight actuators 22. Below, headlights 21 are the low beam headlights 21L and/or the high beam headlights 21H.

The low beam headlight 21L are secured on a left front portion and a right front portion of the own vehicle 100, respectively. Similarly, the high beam headlights 21H are secured to the left front portion and the right front portion of the own vehicle 100, respectively. The low beam headlights 21L and the high beam headlights 21H light an area ahead of the own vehicle 100. The low beam headlights 21L and the high beam headlights 21H are electrically connected to the ECU 90. The ECU 90 can turn on and turn off the low beam headlights 21L and the high beam headlights 21H.

The low beam headlights 21L light the area ahead of the own vehicle 100 with a relatively small lighting angle •. The lighting angle • of the low beam headlights 21L will be referred to as "low beam lighting angle •low". In other words, as shown in FIG. 2A, the low beam headlights 21L light the area ahead of and relatively near the own vehicle 100.

On the other hand, the high beam headlights 21H light the area ahead of the own vehicle 100 with a relatively great lighting angle •. The lighting angle • of the high beam headlights 21H will be referred to as "high beam lighting angle •high". In other words, as shown in FIG. 2B, the high beam headlights 21H light the area ahead of and relatively far from the own vehicle 100.

Figure 3:
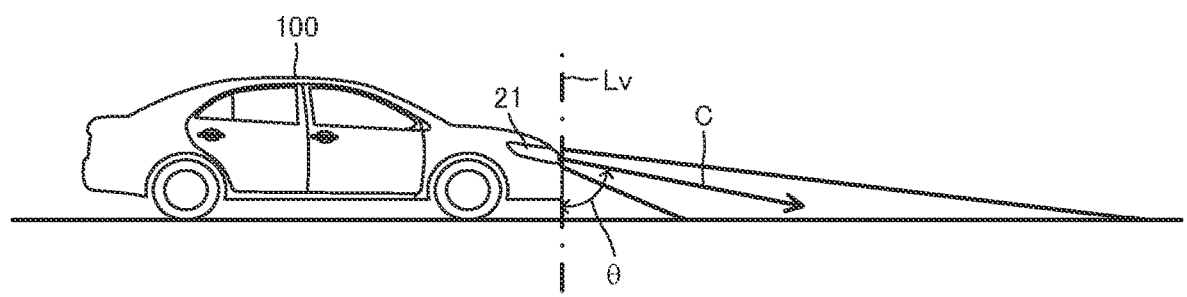
FIG. 3 is a view which shows a lighting angle of the headlight of the own vehicle installed with the headlight control apparatus according to the embodiment of the invention.

The lighting angle • is an angle with which the headlights 21 emit light ahead of the own vehicle 100. In this embodiment, as shown in FIG. 3, the lighting angle • is an angle defined by an axis of the light emitted from the headlight 21 (i.e., a light axis C) and a line Lv which extends vertically.

Figure 2A:
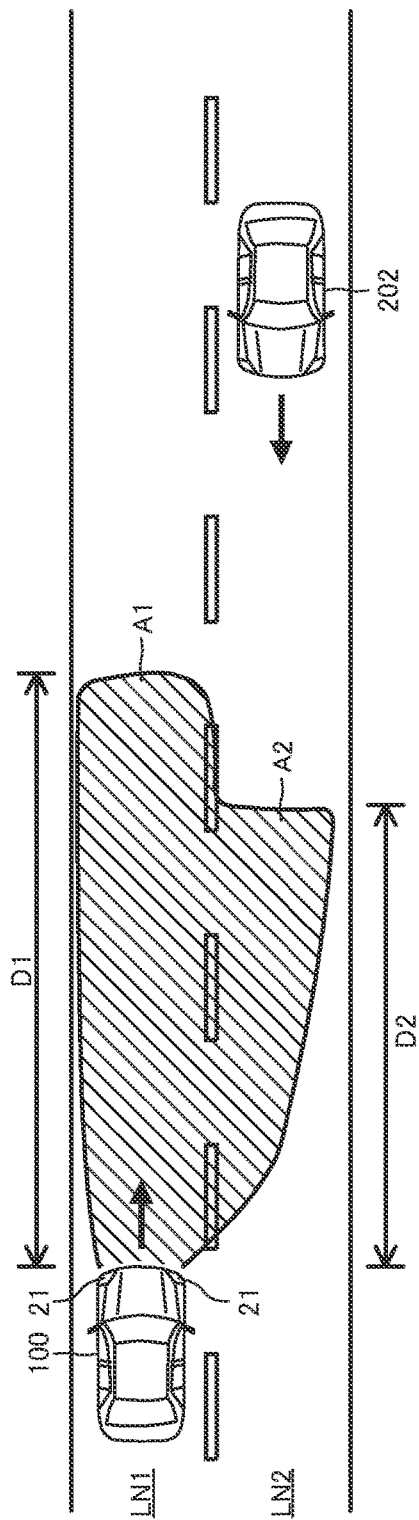
FIG. 2A is a view which shows a scene that low beam headlights of an own vehicle installed with the headlight control apparatus according to the embodiment of the invention, are lighted.
Figure 2B:
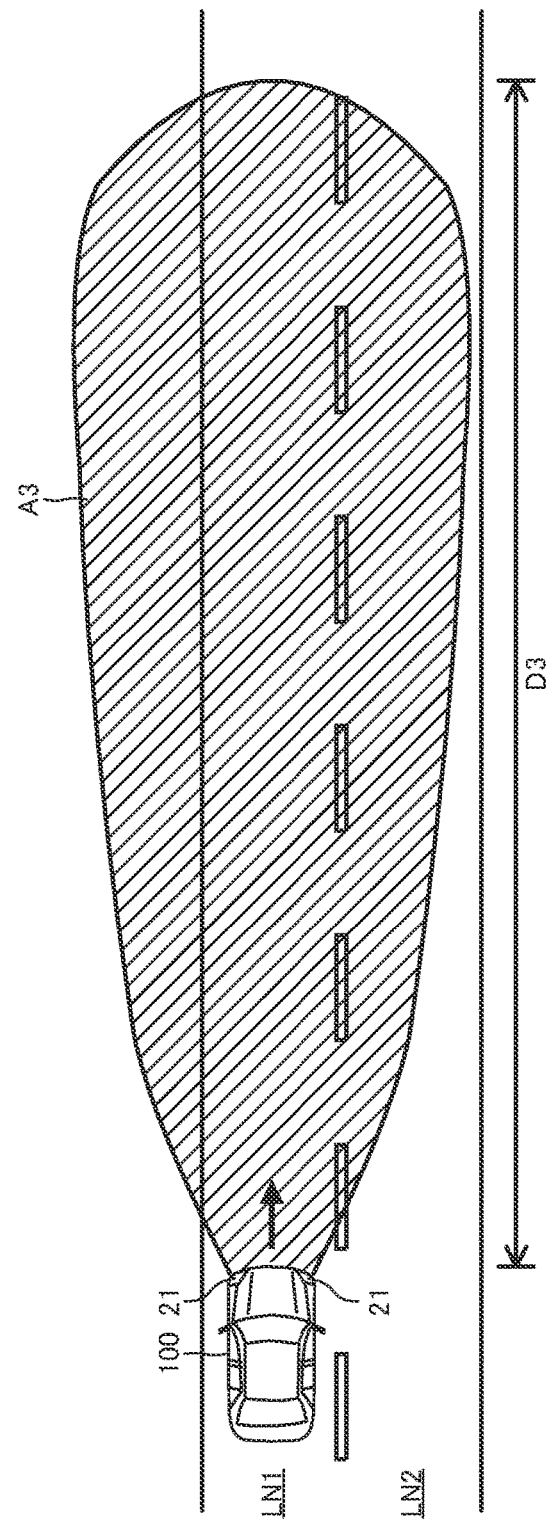
FIG. 2B is a view which shows a scene that high beam headlights of the own vehicle installed with the headlight control apparatus according to the embodiment of the invention, are lighted.

As shown in FIG. 2A, in this embodiment, an area which the low beam headlights 21L light, includes a low beam forward lighting area A1 and a low beam oncoming lane side lighting area A2. The low beam forward lighting area A1 is an area directly in front of the own vehicle 100. The low beam forward lighting area A1 generally has (i) a predetermined length forward from the own vehicle 100 and (ii) a width generally equal to a width of a lane in which the own vehicle 100 moves. The predetermined length of the low beam forward lighting area A1 will be referred to as "low beam forward lighting length D1". The lane in which the own vehicle 100 moves will be referred to as "own vehicle moving lane LN1". The low beam oncoming lane side lighting area A2 is an area ahead of the own vehicle 100 and next to the own vehicle moving lane LN1 at an oncoming lane LN2 side of the own vehicle moving lane LN1. The low beam oncoming lane side lighting area A2 generally has (i) a predetermined length forward from the own vehicle 100 and (ii) a width generally equal to a width of a lane next to the own vehicle moving lane LN1 at the oncoming lane LN2 side of the own vehicle moving lane LN1, i.e. a width of the oncoming lane LN2 or a next lane LN3 next to the own vehicle moving lane LN1 at the oncoming lane LN2 side of the own vehicle moving lane LN1. The predetermined length of the low beam oncoming lane side lighting area A2 will be referred to as "low beam oncoming lane side lighting length D2".

The low beam oncoming lane side lighting length D2 is shorter than the low beam forward lighting length D1. Thus, the low beam oncoming lane side lighting area A2 is narrower than the low beam forward lighting area A1. Thus, the lighting angle •low of the low beam headlight 21L which lights the area at the oncoming lane LN2 side of the own vehicle moving lane LN1, is smaller than the lighting angle •low of the low beam headlight 21L which lights the area directly in front of the own vehicle 100. Thereby, when the lane at the right side of the own vehicle moving lane LN1 is the oncoming lane LN2, and the oncoming vehicle 202 approaches the own vehicle 100, the headlight control apparatus 10 can prevent dazzling the driver of the oncoming vehicle 202.

Further, as shown in FIG. 2B, an area which the high beam headlights 21H light, is a high beam lighting area A3. The high beam lighting area A3 is an area which includes (i) the area directly in front of the own vehicle 100 and (ii) the area ahead of the own vehicle 100 and next to the own vehicle moving lane LN1 at the oncoming lane LN2 side of the own vehicle moving lane LN1. In addition, the high beam lighting area A3 generally has (i) a predetermined length forward from the own vehicle 100 and (ii) a width generally equal to a total of the width of the own vehicle moving lane LN1 and the width of the lane next to the own vehicle moving lane LN1 at the oncoming lane LN2 side of the own vehicle moving lane LN1, i.e. the width of the oncoming lane LN2 or the next lane LN3 next to the own vehicle moving lane LN1 at the oncoming lane LN2 side of the own vehicle moving lane LN1. The predetermined length of the high beam lighting area A3 will be referred to as "high beam lighting length D3".

The high beam lighting length D3 is longer than the low beam forward lighting length D1. Thus, the high beam lighting angle •high is set to an angle greater than the low beam lighting angle •low.

<Headlight Actuators>

The headlight actuators 22 are mechanically connected to the low beam headlights 21L. The headlight actuators 22 can change or adjust the low beam lighting angles •low by moving the low beam headlights 21L up and down. The headlight actuators 22 are electrically connected to the ECU 90. The ECU 90 can change or adjust the low beam lighting angles •low by activating the headlight actuators 22.

<Headlight Operator>

The headlight operator 31 is a device which the driver of the own vehicle 100 operates to request to turn on and off the headlights 21 and request to turn on any of the low beam headlights 21L and the high beam headlights 21H. The headlight operator 31 is provided, for example, on a lever secured to a steering column of the own vehicle 100. The headlight operator 31 is electrically connected to the ECU 90.

When a predetermined operation of turning on the headlights 21 is applied to the headlight operator 31, the headlight operator 31 sends a signal which corresponds to the applied predetermined operation, to the ECU 90. When the ECU 90 receives that signal, the ECU 90 determines that a turning-on request operation of requesting to turn on the headlights 21 is carried out. On the other hand, when a predetermined operation of turning off the headlights 21 is applied to the headlight operator 31, the headlight operator 31 sends a signal which corresponds to the applied predetermined operation, to the ECU 90. When the ECU 90 receives that signal, the ECU 90 determines that a turning-off request operation of requesting to turn off the headlights 21 is carried out.

Further, when a predetermined operation of requesting to turn on the low beam headlights 21L is applied to the headlight operator 31, the headlight operator 31 sends a signal which corresponds to the applied predetermined operation, to the ECU 90. When the ECU 90 receives that signal, the ECU 90 determines that a low beam request operation of requesting to turn on the low beam headlights 21L is carried out. On the other hand, when a predetermined operation of requesting to turn on the high beam headlights 21H is applied to the headlight operator 31, the headlight operator 31 sends a signal which corresponds to the applied predetermined operation, to the ECU 90. When the ECU 90 receives that signal, the ECU 90 determines that a high beam request operation of requesting to turn on the high beam headlights 21H is carried out.

<Automatic High Beam Control Operator>

The automatic high beam control operator 32 is a device which the driver of the own vehicle 100 operates to request to execute an automatic high beam control described later. The automatic high beam control operator 32 is, for example a button or switch. The automatic high beam control operator 32 is electrically connected to the ECU 90. When a predetermined operation of requesting to execute the automatic high beam control is applied to the automatic high beam control operator 32, the automatic high beam control operator 32 sends a signal which corresponds to the applied predetermined operation, to the ECU 90. When the ECU 90 receives that signal, the ECU 90 determines that the automatic high beam control is requested to be executed. On the other hand, when a predetermined operation of requesting to stop executing the automatic high beam control is applied to the automatic high beam control operator 32, the automatic high beam control operator 32 sends a signal which corresponds to the applied predetermined operation, to the ECU 90. When the ECU 90 receives that signal, the ECU 90 determines that executing the automatic high beam control is requested to be stopped.

<Forward Image Acquiring Device>

The forward image acquiring device 41 is a device which acquires images of a view ahead of the own vehicle 100. The image of the view ahead of the own vehicle 100 will be referred to as "forward image IM_F". The forward image acquiring device 41 includes, for example, a camera. The forward image acquiring device 41 is electrically connected to the ECU 90. The forward image acquiring device 41 sends information on the acquired forward image IM_F to the ECU 90. The ECU 90 acquires the forward image IM_F from the information sent by the forward image acquiring device 41 and can detect vehicles ahead of the own vehicle 100, based on the acquired information. The vehicle ahead of the own vehicle 100 will be referred to as "forward moving vehicle 200F". In this embodiment, the forward moving vehicles 200F include a preceding vehicle, next lane vehicles, and oncoming vehicles. The preceding vehicle is a vehicle which moves in the same direction as a moving direction of the own vehicle 100 in the own vehicle moving lane LN1. The next lane vehicle is a vehicle which moves in the same direction as the moving direction of the own vehicle 100 in the next lane LN3 next to the own vehicle moving lane LN1. The oncoming vehicle is a vehicle which moves in the opposite direction to the moving direction of the own vehicle 100 in the oncoming lane LN2.

<Forward Information Acquiring Device>

The forward information acquiring device 42 is a device which acquires information on a situation ahead of the own vehicle 100. The information on the situation ahead of the own vehicle 100 will be referred to as "forward situation information INF". For example, the forward information acquiring device 42 includes at least one of sensors such as (i) radar sensors such as millimeter wave radars, (ii) ultrasonic wave sensors such as clearance sonars, and (iii) laser radars such as LiDAR. The forward information acquiring device 42 is electrically connected to the ECU 90. The forward information acquiring device 42 sends the acquired forward situation information INF to the ECU 90. The ECU 90 can acquire information on the forward moving vehicles 200F, based on the forward situation information INF. When the forward information acquiring device 42 includes the sensors described above, the forward situation information INF is information on objects such as (i) time from when the sensor transmits an electromagnetic wave or a sonic wave to when the sensor receives the electromagnetic wave or the sonic wave reflected on the objects and (ii) a direction from which the sensor receives the reflected electromagnetic wave or the reflected sonic wave.

<Summary of Operations of Headlight Control Apparatus>

Next, a summary of operations of the headlight control apparatus 10 will be described. The headlight control apparatus 10 turns on the headlights 21 when the turn-on request operation is carried out. On the other hand, when the turn-off request operation is carried out, the headlight control apparatus 10 turns off the headlights 21. Further, the headlight control apparatus 10 turns on the low beam headlights 21L as shown in FIG. 2A when (i) the headlight control apparatus 10 does not execute the automatic high beam control, (ii) the headlight control apparatus 10 has turned on the headlights 21, and (iii) the low beam request operation is carried out. On the other hand, when (i) the headlight control apparatus 10 does not execute the automatic high beam control, (ii) the headlight control apparatus 10 has turned on the headlights 21, and (iii) the high beam request operation is carried out, the headlight control apparatus 10 turns on the high beam headlights 21H as shown in FIG. 2B.

The headlight control apparatus 10 is configured to execute the automatic high beam control and a lighting angle control.

<Automatic Height Beam Control>

The headlight control apparatus 10 starts to execute the automatic high beam control when the headlight control apparatus 10 determines that the automatic high beam control is requested to be executed.

When the headlight control apparatus 10 (i) executes the automatic high beam control, (ii) has turned on the headlights 21, and (iii) determines that the low beam request operation is carried out, the headlight control apparatus 10 turns on the low beam headlights 21L as shown in FIG. 2A.

Figure 4:
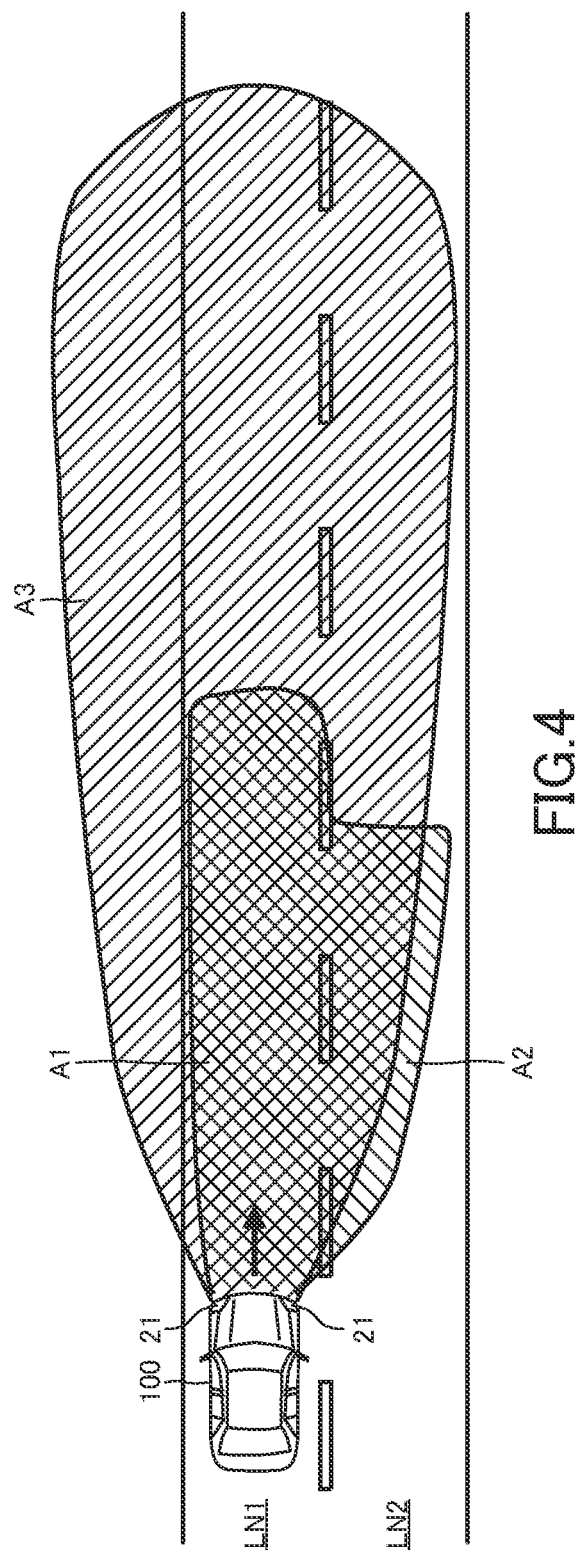
FIG. 4 is a view which shows a scene that the low beam headlights and the high beam headlights of the own vehicle installed with the headlight control apparatus according to the embodiment of the invention, are lighted.

On the other hand, when the headlight control apparatus 10 (i) executes the automatic high beam control, (ii) has turned on the headlights 21, and (iii) determines that the high beam request operation is carried out, the headlight control apparatus 10 turns on the low beam headlights 21L and the high beam headlights 21H as shown in FIG. 4. Then, when the headlight control apparatus 10 detects at least one forward moving vehicle 200F, based on the forward image IM_F (or the forward image IM_F and the forward situation information INF) while the headlight control apparatus 10 executes the automatic high beam control and has turned on the high beam headlights 21H, the headlight control apparatus 10 stops emitting light from a part of the high beam headlights 21H or blocks a part of the light emitted from the high beam headlights 21H so as to prevent the detected at least one forward moving vehicle 200F from being exposed to the light emitted from the high beam headlights 21H. In other words, the headlight control apparatus 10 shields a part of the high beam headlights 21H.

<Lighting Angle Control>

When (i) there is a preceding vehicle 201 ahead of the own vehicle 100, and (ii) a distance between the own vehicle 100 and the preceding vehicle 201 is longer than the low beam forward lighting length D1, the low beam headlights 21L do not light an area between a front edge E1 of the low beam forward lighting area A1 and the preceding vehicle 201 as shown in FIG. 5A. In this case, adjusting the low beam lighting angle •low so as to light an optimum lighting area Aopt by the low beam headlights 21L as shown in FIG. 5B, can ensure a high visibility of the driver of the own vehicle 100 to see the view ahead of the own vehicle 100 with avoiding dazzling the driver of the preceding vehicle 201. The optimum lighting area Aopt is an area which the low beam headlights 21L light when one of the low beam headlights 21L lights at least an area from the own vehicle 100 to rear wheels RW of the preceding vehicle 201.

Further, when (i) there is a next lane vehicle 203 ahead of the own vehicle 100, and (ii) a distance between the own vehicle 100 and the next lane vehicle 203 is longer than the low beam oncoming lane side lighting length D2, the low beam headlights 21L do not light an area between a front edge E2 of the low beam oncoming lane side lighting area A2 and the next lane vehicle 203 as shown in FIG. 6A. In this case, adjusting the low beam lighting angle •low so as to light the optimum lighting area Aop by the low beam headlights 21L as shown in FIG. 6B, can ensure the high visibility of the driver of the own vehicle 100 to see the view ahead of the own vehicle 100 with avoiding dazzling a driver of the next lane vehicle 203. The optimum lighting area Aopt is an area which the low beam headlights 21L light when one of the low beam headlights 21L lights at least an area from the own vehicle 100 to rear wheels RW of the next lane vehicle 203.

The headlight control apparatus 10 executes a lighting angle control of adjusting the lighting angles • of the headlights 21, depending on a relationship in position between the own vehicle 100 and the forward moving vehicles 200F to ensure the high visibility of the driver of the own vehicle 100 to see the view ahead of the own vehicle 100 with avoiding dazzling the drivers of the forward moving vehicles 200F.

In this embodiment, the headlight control apparatus 10 is configured to adjust only the lighting angles •low of the low beam headlights 21L by the lighting angle control. In this regard, the headlight control apparatus 10 may be configured to adjust the lighting angles • of the low beam headlights 21L and the high beam headlights 21H by the lighting angle control. Also, the headlight control apparatus 10 may be configured to adjust only the lighting angles •high of the high beam headlights 21H by the lighting angle control.

Further, in this embodiment, the headlight control apparatus 10 is configured to execute the lighting angle control when the headlight control apparatus 10 has turned on the low beam headlights 21L, independently of whether the headlight control apparatus 10 executes the automatic high beam control. In this regard, the headlight control apparatus 10 may be configured to execute the lighting angle control when the headlight control apparatus 10 executes the automatic high beam control and has turned on the low beam headlights 21L.

The headlight control apparatus 10 executes a vehicle image detecting process of detecting images of the forward moving vehicles 200F, based on the forward image IM_F while the headlight control apparatus 10 executes the light angle control. The image of the forward moving vehicle 200F will be referred to as "forward moving vehicle image IM_200F".

In this embodiment, a base lighting angle •base is previously set as an initial value of the low beam lighting angle •low. Further, when the low beam headlights 21L are turned on with the base lighting angle •base, the low beam forward lighting area A1 is illuminated by the light emitted from the low beam headlight 21L at the base lighting angle •base, and the low beam oncoming lane side lighting area A2 is illuminated by the light emitted from the low beam headlight 21L at the lighting angle smaller, but near the base lighting angle •base by a predetermined angle (i.e., a cut-off angle •cutoff). Thus, in this embodiment, the lighting angle •low of the low beam headlight 21L which lights the area at the oncoming lane LN2 side with respect to the own vehicle moving lane LN1, is set to an angle smaller than the lighting angle •low of the low beam headlight 21L which lights the area directly in front of the own vehicle 100 by the predetermined angle (i.e., the cut-off angle •cutoff).

When the headlight control apparatus 10 does not detect any forward moving vehicle images IM_200F, based on the forward image IM_F, the headlight control apparatus 10 sets the base lighting angle •base as a target lighting angle •tgt and activates the headlight actuators 22 to adjust the low beam lighting angles •low to the target lighting angles •tgt.

On the other hand, when the headlight control apparatus 10 detects at least one forward moving vehicle image IM_200F, based on the forward image IM_F, the headlight control apparatus 10 sets the target lighting angle •tgt as described below and adjusts the low beam lighting angle •low.

Figure 7A:
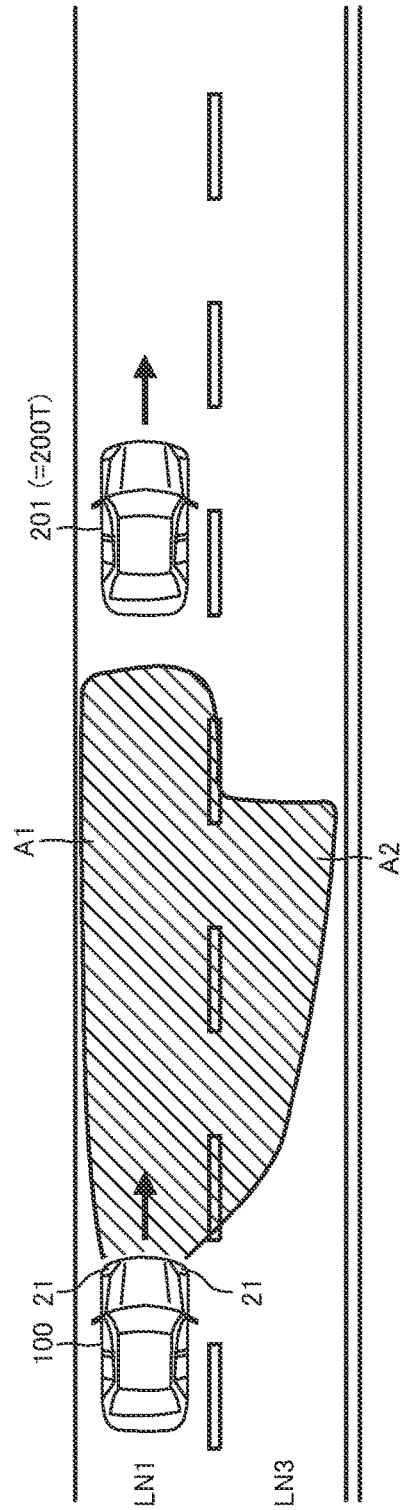
FIG. 7A is a view which shows a scene that the preceding vehicle moves directly in front of the own vehicle installed with the headlight control apparatus according to the embodiment of the invention, and the low beam headlights are lighted with a target lighting angle set to a base lighting angle.
Figure 8:
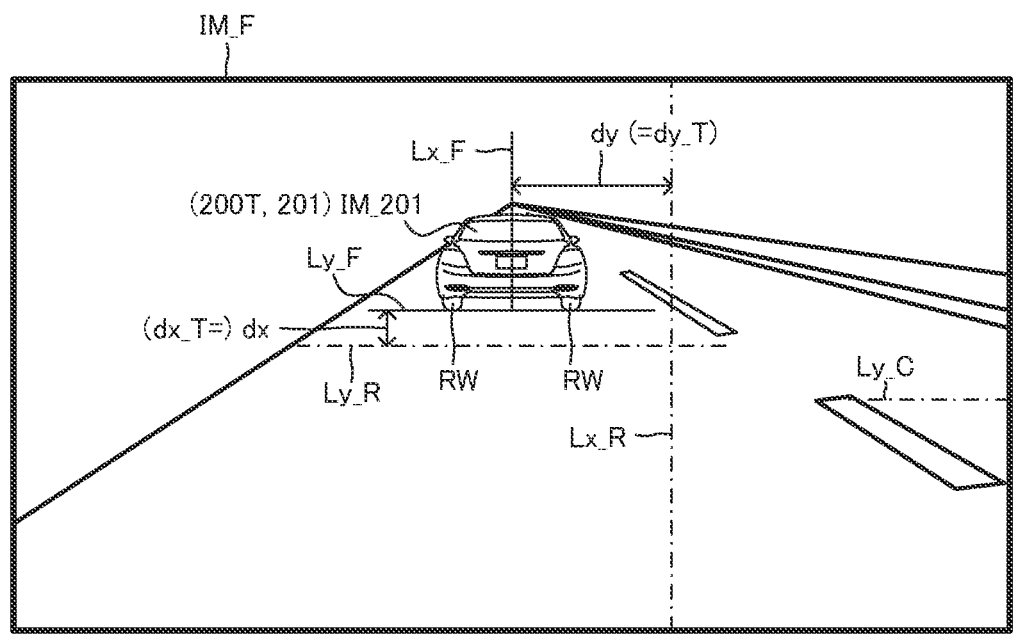
FIG. 8 is a view which shows an image of the scene shown in FIG. 7A.

When the preceding vehicle 201 moves directly in front of the own vehicle 100 as shown in FIG. 7A, the forward image IM_F shown in FIG. 8 is acquired, and an image IM_201 of a vehicle (i.e., the preceding vehicle 201) is detected, based on the acquired forward image IM_F.

Figure 10:
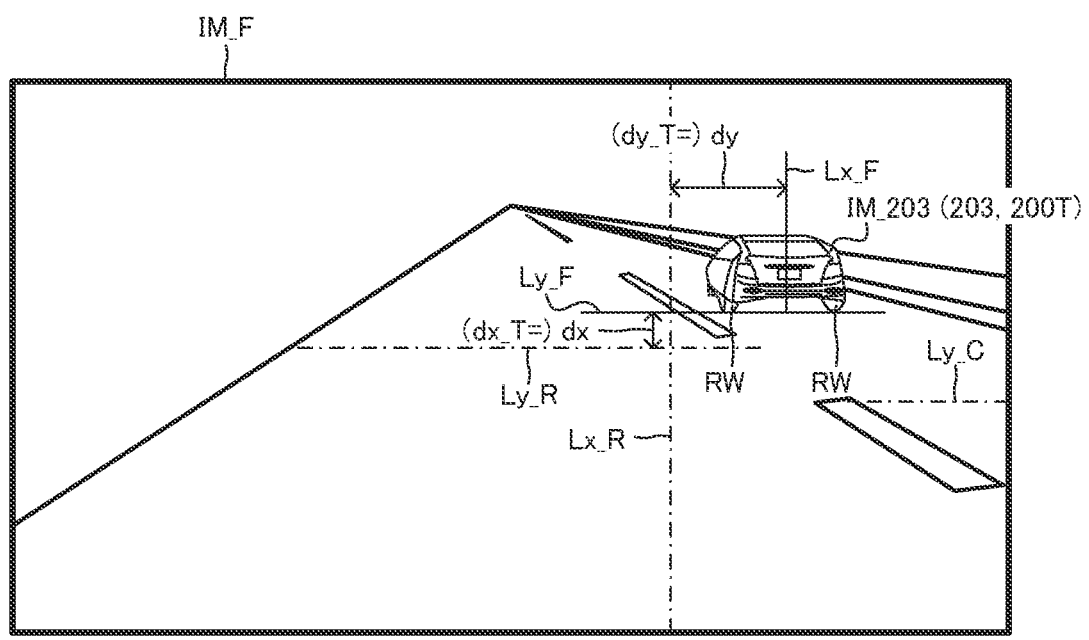
FIG. 10 is a view which shows an image of the scene shown in FIG. 9A.

When the next lane vehicle 203 moves ahead of the own vehicle 100 in the next lane LN3 at the right side of the own vehicle moving lane LN1 as shown in FIG. 9A, the forward image IM_F shown in FIG. 10 is acquired, and an image IM_203 of a vehicle (i.e., the next lane vehicle 203) is detected, based on the acquired forward image IM_F.

Figure 11A:
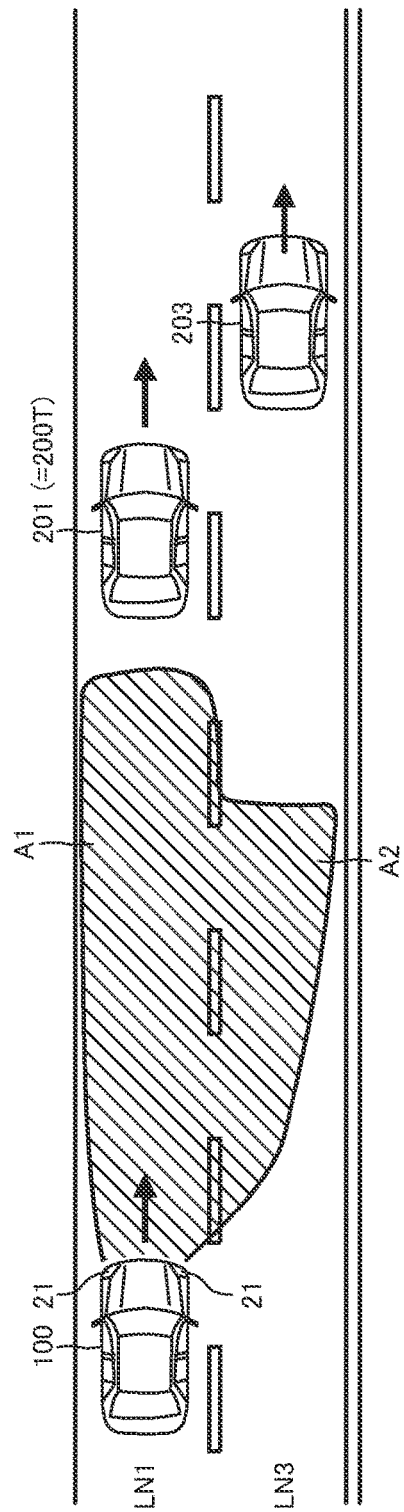
FIG. 11A is a view which shows a scene that the preceding vehicle and the next lane vehicle move ahead of the own vehicle installed with the headlight control apparatus according to the embodiment of the invention, and the low beam headlights of the own vehicle are lighted with the target lighting angle set to the base lighting angle.
Figure 12:
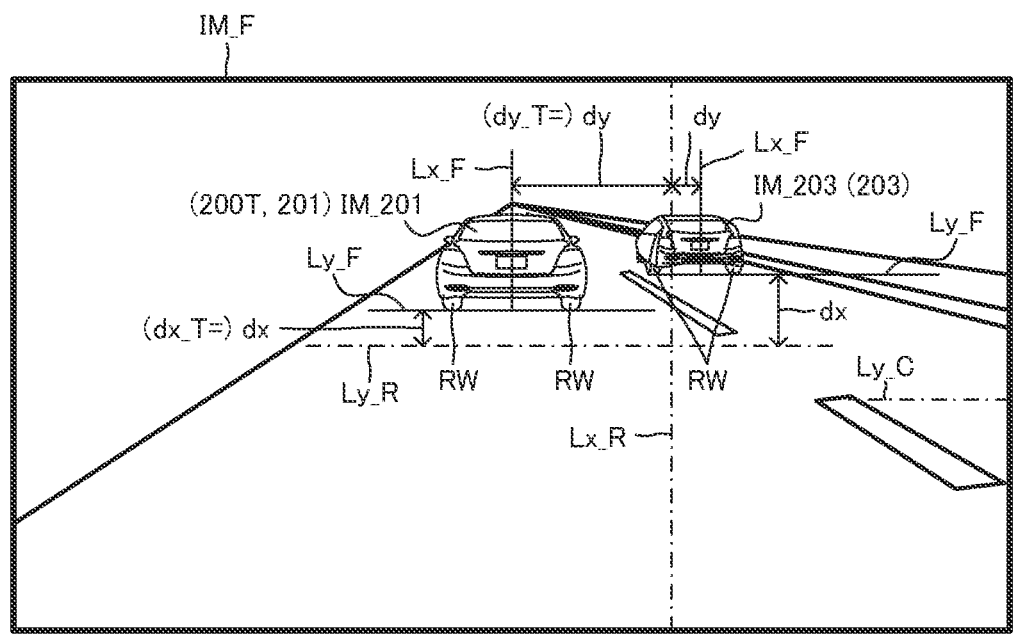
FIG. 12 is a view which shows an image of the scene shown in FIG. 11A.

When there are the preceding vehicle 201 and the next lane vehicle 203 ahead of the own vehicle 100 as shown in FIG. 11A, the forward image IM_F shown in FIG. 12 is acquired, and the image IM_201 and the image IM_203 of two vehicles (i.e., the preceding vehicle 201 and the next lane vehicle 203) are detected, based on the acquired forward image IM_F.

Figure 14:
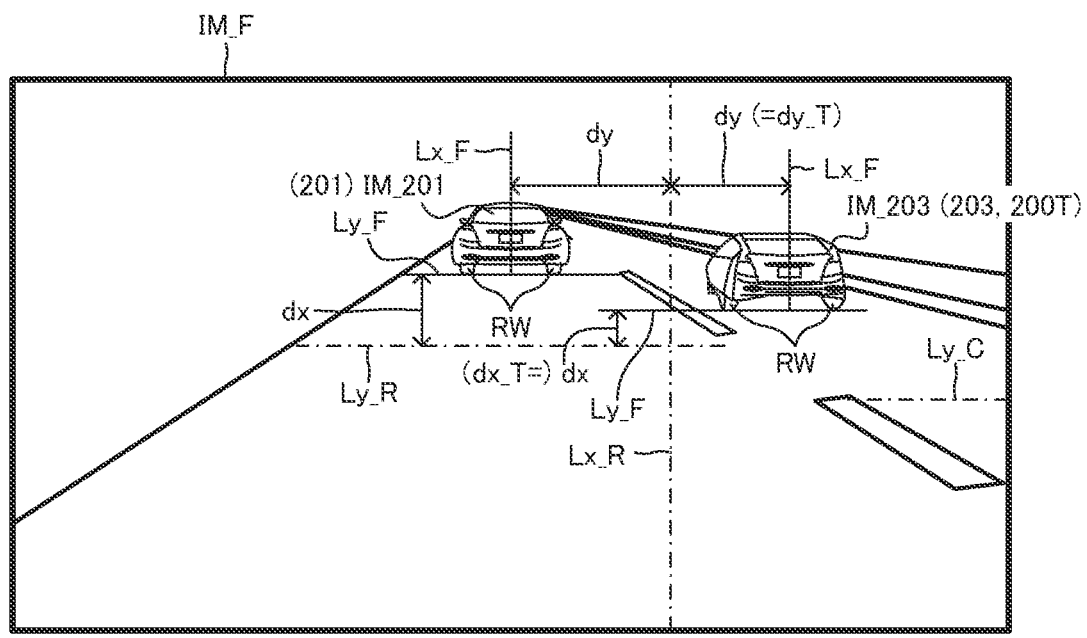
FIG. 14 is a view which shows an image of the scene shown in FIG. 13A.

When there are the preceding vehicle 201 and the next lane vehicle 203 ahead of the own vehicle 100 as shown in FIG. 13A, the forward image IM_F shown in FIG. 14 is acquired, and the image IM_201 and the image IM_203 of two vehicles (i.e., the preceding vehicle 201 and the next lane vehicle 203) are detected, based on the acquired forward image IM_F.

Lines Ly_R in FIG. 8, FIG. 10, FIG. 12 and FIG. 14 are reference lateral lines. The reference lateral line Ly_R is a reference line which laterally extends in the forward image IM_F. In particular, the reference lateral line Ly_R is a line which defines a front edge which the light emitted forward straight from the low beam headlight 21L can reach with the low beam lighting angle •low being set to the base lighting angle •base. In this embodiment, the reference lateral line Ly_R is a line which defines the low beam forward lighting length D1 with the low beam lighting angle •low being set to the base lighting angle •base. In other words, the reference lateral line Ly_R is a line which defines the front edge E1 of the low beam forward lighting area A1 (see FIG. 5A) with the low beam lighting angle •low being set to the base lighting angle •base.

A line Lx_R is a reference longitudinal line. The reference longitudinal line Lx_R is a reference line which longitudinally extends in the forward image IM_F. In particular, the reference longitudinal line Lx_R is a line which separates the low beam forward lighting area A1 and the low beam oncoming lane side lighting area A2 from each other.

A line Ly_F is a forward moving vehicle lateral line. The forward moving vehicle lateral line Ly_F is a line which laterally extends in the forward image IM_F. Also, the forward moving vehicle lateral line Ly_F is a line which defines a longitudinal position of the image IM_200F of the forward moving vehicle 200F in the forward image IM_F. In this embodiment, the forward moving vehicle lateral line Ly_F is a line which defines a longitudinal position of the rear wheels RW of the forward moving vehicle 200F in the forward image IM_F.

A line Lx_F is a forward moving vehicle longitudinal line. The forward moving vehicle longitudinal line Lx_F is a line which longitudinally extends in the forward image IM_F. Also, the forward moving vehicle longitudinal line Lx_F is a line which defines a lateral position of the image IM_200F of the forward moving vehicle 200F in the forward image IM_F. In this embodiment, the forward moving vehicle longitudinal line Lx_F is a line which extends through a laterally center of the image IM_200F of the forward moving vehicle 200F in the forward image IM_F.

A line Ly_C is a cut-off line. The cut-off line Ly_C is a line which defines a front edge which the light emitted to the oncoming lane LN2 side with respect to the own vehicle 100 from the low beam headlight 21L can reach with the low beam lighting angle •low being set to the base lighting angle •base. In this embodiment, the cut-off line Ly_C is a line which defines the low beam oncoming lane side lighting length D2 with the low beam lighting angle •low being set to the base lighting angle •base. In other words, the cut-off line Ly_C is a line which defines the front edge E2 of the low beam oncoming lane side lighting area A2 (see FIG. 6A) with the low beam lighting angle •low being set to the base lighting angle •base.

In an example shown in FIG. 7A, a distance from the own vehicle 100 to the preceding vehicle 201 is longer than the low beam forward lighting length D1. In an example shown in FIG. 9A, a distance from the own vehicle 100 to the next lane vehicle 203 is longer than the low beam forward lighting length D1. Thus, the distance from the own vehicle 100 to the next lane vehicle 203 is longer than the low beam oncoming lane side lighting length D2. In an example shown in FIG. 11A, the distance from the own vehicle 100 to the preceding vehicle 201 and the distance from the own vehicle 100 to the next lane vehicle 203 are longer than the low beam forward lighting length D1. In an example shown in FIG. 13A, the distance from the own vehicle 100 to the preceding vehicle 201 and the distance from the own vehicle 100 to the next lane vehicle 203 are longer than the low beam forward lighting length D1.

When the headlight control apparatus 10 detects the forward moving vehicle images IM_200F, the headlight control apparatus 10 acquires a longitudinal difference dx and a lateral difference dy of each forward moving vehicle image IM_200F. The longitudinal difference dx is a length on the forward image IM_F between the reference lateral line Ly_R and the forward moving vehicle lateral line Ly_F.

The lateral difference dy is a length on the forward image IM_F between the reference longitudinal line Lx_R and the forward moving vehicle longitudinal line Lx_F.

The headlight control apparatus 10 sets the forward moving vehicle 200F closest to the own vehicle 100 as a target vehicle 200T from among the forward moving vehicles 200F represented by the detected forward moving vehicle images IM_200F. In particular, the headlight control apparatus 10 sets the forward moving vehicle 200F which has the shortest longitudinal difference dx as a target vehicle 200T from among the forward moving vehicles 200F represented by the detected forward moving vehicle images IM_200F.

In an example shown in FIG. 8, there is one forward moving vehicle 200F. Thus, the one forward moving vehicle image IM_200F is detected from the forward image IM_F. Thus, the one forward moving vehicle 200F (i.e., the preceding vehicle 201) is set as the target vehicle 200T.

In an example shown in FIG. 10, there is one forward moving vehicle 200F, and thus one forward moving vehicle image IM_200F is detected from the forward image IM_F. Thus, the one forward moving vehicle 200F (i.e., the next lane vehicle 203) is set as the target vehicle 200T.

In an example shown in FIG. 12, the forward moving vehicle images IM_200F (in this example, two forward moving vehicle images IM_200F) are detected from the forward image IM_F. The longitudinal difference dx of one (i.e., the preceding vehicle 201) of the two forward moving vehicles 200F represented by the forward moving vehicle images IM_200F is shorter than the longitudinal difference dx of the other forward moving vehicle 200F (i.e., the next lane vehicle 203) represented by the other forward moving vehicle image IM_200F. Thus, the preceding vehicle 201 is set as the target vehicle 200T.

In an example shown in FIG. 14, the forward moving vehicle images IM_200F (in this example, two forward moving vehicle images IM_200F) are detected from the forward image IM_F. The longitudinal difference dx of one (i.e., the next lane vehicle 203) of the two forward moving vehicles 200F represented by the forward moving vehicle images IM_200F is shorter than the longitudinal difference dx of the other forward moving vehicle 200F (i.e., the preceding vehicle 201) represented by the other forward moving vehicle image IM_200F. Thus, the next lane vehicle 203 is set as the target vehicle 200T.

After the headlight control apparatus 10 sets the target vehicle 200T, the headlight control apparatus 10 sets the longitudinal difference dx of the target vehicle 200T as a target longitudinal difference dx_T and sets the lateral difference dy of the target vehicle 200T as a target lateral difference dy_T.

In the example shown in FIG. 8, the longitudinal difference dx of the preceding vehicle 201 is set as the target longitudinal difference dx_T, and the lateral difference dy of the preceding vehicle 201 is set as the target lateral difference dy_T. In the example shown in FIG. 10, the longitudinal difference dx of the next lane vehicle 203 is set as the target longitudinal difference dx_T, and the lateral difference dy of the next lane vehicle 203 is set as the target lateral difference dy_T. In the example shown in FIG. 12, the longitudinal difference dx of the preceding vehicle 201 is set as the target longitudinal difference dx_T, and the lateral difference dy of the preceding vehicle 201 is set as the target lateral difference dy_T. In the example shown in FIG. 14, the longitudinal difference dx of the next lane vehicle 203 is set as the target longitudinal difference dx_T, and the lateral difference dy of the next lane vehicle 203 is set as the target lateral difference dy_T.

The headlight control apparatus 10 acquires (i) a first angle •1, based on the target longitudinal difference dx_T and (ii) a second angle •2, based on the target lateral difference dy_T. Then, the headlight control apparatus 10 sets a value acquired by adding the acquired first angle •1 and the acquired second angle •2 to the base lighting angle •base as the target lighting angle •tgt. Then, the headlight control apparatus 10 adjusts the low beam lighting angles •low to the target lighting angles •tgt by activating the headlight actuators 22.

The first angle •1 is an angle to be added to the base lighting angle •base to make the target longitudinal difference dx_T zero. In this embodiment, when the target longitudinal difference dx-T is positive, the first angle •1 takes a positive value. On the other hand, when the target longitudinal difference dx_T is negative, the first angle •1 takes a negative value. An absolute value of the first angle •1 increases as an absolute value of the target longitudinal difference dx_T increases. The second angle •2 is an angle to be added to the base lighting angle •base to cause the cut-off line Ly_C to correspond to the forward moving vehicle lateral line Ly_F (i.e., a target vehicle lateral line) of the target vehicle 200T.

In the example shown in FIG. 8, the target longitudinal difference dx_T takes a value which represents that the target vehicle 200T (i.e., the preceding vehicle 201) is at a position beyond the reference lateral line Ly_R forward from the own vehicle 100. The target lateral difference dy_T takes a value which represents that the target vehicle 200T is a vehicle which moves directly in front of the own vehicle 100, i.e., the target vehicle 200T is the preceding vehicle 201. Thus, the headlight control apparatus 10 detects that the target vehicle 200T (i.e. the preceding vehicle 201) is a vehicle which is at a position beyond the reference lateral line Ly_R forward from the own vehicle 100, based on the target longitudinal difference dx_T, and detects that the target vehicle 200T is a vehicle which moves directly in front of the own vehicle 100, i.e., the target vehicle 200T is the preceding vehicle 201, based on the target lateral difference dy_T.

Then, the headlight control apparatus 10 acquires the first angle •1, based on the target longitudinal difference dx_T, which first angle •1 is an angle, by which the headlight control apparatus 10 needs to increase the low beam lighting angle •low in order to make the target longitudinal difference dx_T zero. In addition, the headlight control apparatus 10 acquires the second angle •2 of zero, i.e., sets the second angle •2 to zero, since the target vehicle 200T is the preceding vehicle 201, and thus the headlight control apparatus 10 does not need to cause the cut-off line Ly_C to correspond the cut-off line Ly_C to the forward moving vehicle lateral line Ly_F of the target vehicle 200T in order to light the optimum lighting area Aopt by the low beam headlights 21L.

Figure 7B:
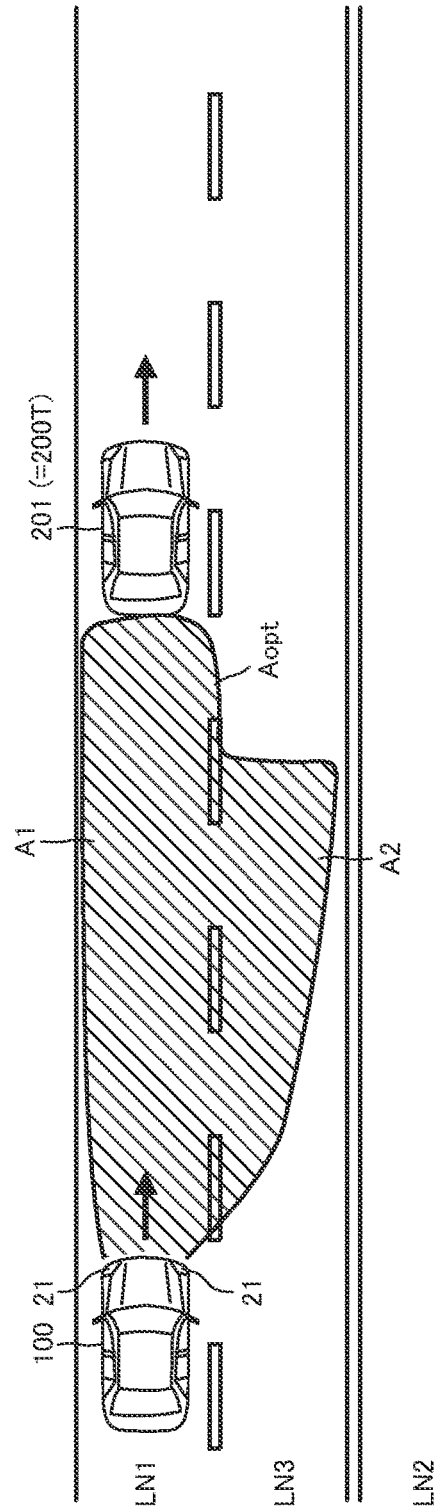
FIG. 7B is a view similar to FIG. 7A and which shows a scene that the low beam headlights of the own vehicle are lighted with the target lighting angle set to an angle acquired by correcting the base lighting angle.

Then, the headlight control apparatus 10 acquires an angle by adding the first angle •1 and the second angle •2 to the base lighting angle •base and sets the acquired angle as the target lighting angle •tgt. In this case, the second angle •2 is zero. Thus, adding the second angle •2 to the base lighting angle •base, is the same as not adding the second angle •2 to the base lighting angle •base. Then, the headlight control apparatus 10 adjusts the low beam lighting angles •low to the target lighting angle •tgt by activating the headlight actuators 22. Thereby, as shown in FIG. 7B, the optimum lighting area Aopt is illuminated by the low beam headlights 21L.

In the example shown in FIG. 10, the target longitudinal difference dx_T takes a value which represents that the target vehicle 200T (i.e., the next lane vehicle 203) is at a position beyond the reference lateral line Ly_R forward from the own vehicle 100. Further, the target lateral difference dy_T takes a value which represents that the target vehicle 200T is a vehicle which moves ahead of the own vehicle 100 in the next lane LN3 on the right side of the own vehicle moving lane LN1, i.e. the target vehicle 200T is the next lane vehicle 203. Thus, the headlight control apparatus 10 detects that the target vehicle 200T (i.e. the next lane vehicle 203) is a vehicle which is at a position beyond the reference lateral line Ly_R forward from the own vehicle 100, based on the target longitudinal difference dx_T, and detects that the target vehicle 200T is a vehicle which moves ahead of the own vehicle 100 in the next lane LN3 on the right side of the own vehicle moving lane LN1, i.e. the target vehicle 200T is the next lane vehicle 203, based on the target lateral difference dy_T.

Then, the headlight control apparatus 10 acquires the first angle •1, based on the target longitudinal difference dx_T, which first angle •1 is an angle, by which the headlight control apparatus 10 needs to increase the low beam lighting angle •low in order to make the target longitudinal difference dx_T zero. In addition, the headlight control apparatus 10 acquires the cut-off angle •cutoff (i.e., the predetermined angle) as the second angle •2, i.e., sets the second angle •2 to the cut-off angle •cutoff, since the target vehicle 200T is the next lane vehicle 203, and thus the headlight control apparatus 10 needs to cause the cut-off line Ly_C to correspond the cut-off line Ly_C to the forward moving vehicle lateral line Ly_F of the target vehicle 200T in order to light the optimum lighting area Aopt by the low beam headlights 21L.

Then, the headlight control apparatus 10 acquires an angle by adding the first angle •1 and the second angle •2 to the base lighting angle •base and sets the acquired angle as the target lighting angle •tgt. Then, the headlight control apparatus 10 adjusts the low beam lighting angles •low to the target lighting angle •tgt by activating the headlight actuators 22. Thereby, as shown in FIG. 9B, the optimum lighting area Aopt is illuminated by the low beam headlights 21L.

Figure 11B:
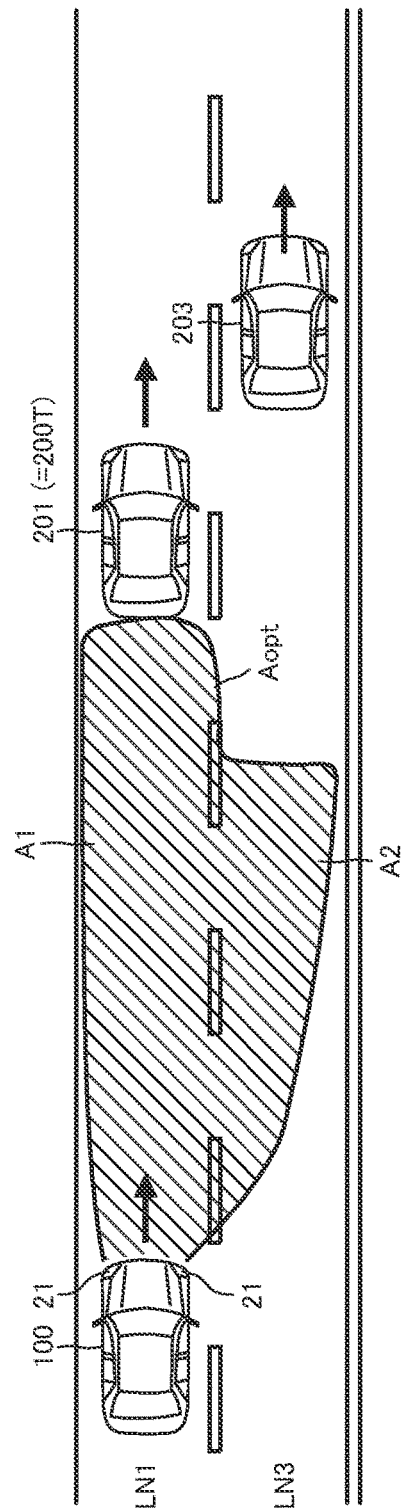
FIG. 11B is a view similar to FIG. 11A and which shows a scene that the low beam headlights of the own vehicle are lighted with the target lighting angle set to an angle acquired by correcting the base lighting angle.

In the example shown in FIG. 12, the preceding vehicle 201 is set as the target vehicle 200T. Thus, the target lighting angle •tgt is set as described in connection to FIG. 7 and FIG. 8. Then, the headlight control apparatus 10 adjusts the low beam lighting angles •low to the target lighting angle •tgt by activating the headlight actuators 22. Thereby, as shown in FIG. 11B, the optimum lighting area Aopt is illuminated by the low beam headlights 21L.

In the example shown in FIG. 14, the next lane vehicle 203 is set as the target vehicle 200T. Thus, the target lighting angle •tgt is set as described in connection to FIG. 9 and FIG. 10. Then, the headlight control apparatus 10 adjusts the low beam lighting angles •low to the target lighting angle •tgt by activating the headlight actuators 22. Thereby, as shown in FIG. 13B, the optimum lighting area Aopt is illuminated by the low beam headlights 21L.

Thereby, the optimum lighting area Aopt is illuminated by the low beam headlights 21L. Thus, the headlight control apparatus 10 can ensure the high visibility of the driver of the own vehicle 100 to see the view ahead of the own vehicle 100 with avoiding dazzling the driver of the target vehicle 200T.

The headlight control apparatus 10 has been described, using examples that one or both of the preceding vehicle 201 and the next lane vehicle 203 is/are detected as the forward moving vehicle(s) 200F. However, the headlight control apparatus 10 may be configured to detect the image IM_202 of the oncoming vehicle 202, set the oncoming vehicle 202 represented by the detected image IM_202 as the target vehicle 200T, and adjust the low beam lighting angle •low so as to light the optimum lighting area Aopt regarding the target vehicle 200T by the low beam headlights 21L.

<Specific Operations of Headlight Control Apparatus>

Figure 15:
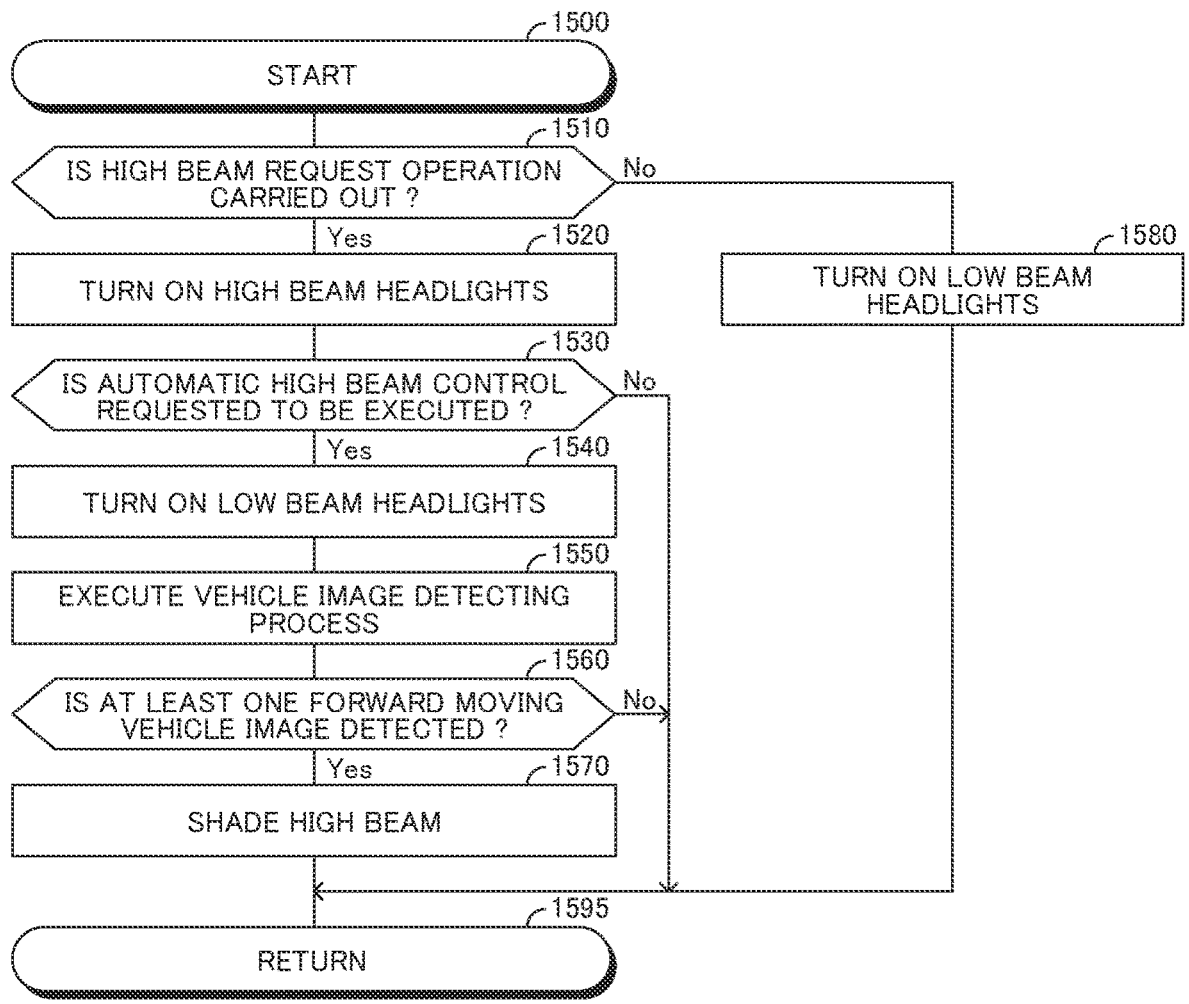
FIG. 15 is a view which shows a flowchart of a routine executed by the headlight control apparatus according to the embodiment of the invention.

Next, specific operations of the headlight control apparatus 10 will be described. The CPU of the ECU 90 of the headlight control apparatus 10 is configured or programmed to execute a routine shown in FIG. 15 each time a predetermined calculation time elapses when the CPU turns on the headlights 21. Thus, at a predetermined timing, the CPU starts to execute a process from a step 1500 of the routine shown in FIG. 15 and proceeds with the process to a step 1510 to determine whether the high beam request operation is carried out.

When the CPU determines "Yes" at the step 1510, the CPU proceeds with the process to a step 1520 to turn on the high beam headlights 21H. Next, the CPU proceeds with the process to a step 1530 to determine whether the automatic high beam control is requested to be executed.

When the CPU determines "Yes" at the step 1530, the CPU proceeds with the process to a step 1540 to turn on the low beam headlights 21L. Next, the CPU proceeds with the process to a step 1550 to execute the vehicle image detecting process of detecting the forward moving vehicle images IM_200F from the forward image IM_F. Next, the CPU proceeds with the process to a step 1560 to determine whether at least one forward moving vehicle image IM_200F is detected from the forward image IM_F by the vehicle image detecting process executed at the step 1550.

When the CPU determines "Yes" at the step 1560, the CPU proceeds with the process to a step 1570 to shade the high beam with respect to the at least one forward moving vehicle 200F represented by the at least one forward moving vehicle image IM_200F detected at the step 1550. Next, the CPU proceeds with the process to a step 1595 to terminate executing this routine once.

On the other hand, when the CPU determines "No" at the step 1560, the CPU proceeds with the process directly to the step 1595 to terminate executing this routine once.

Further, when the CPU determines "No" at the step 1530, the CPU proceeds with the process directly to the step 1595 to terminate executing this routine once.

Further, when the CPU determines "No" at the step 1510, the CPU proceeds with the process to a step 1580 to turn on the low beam headlights 21L. Next, the CPU proceeds with the process to the step 1595 to terminate executing this routine once.

Figure 16:
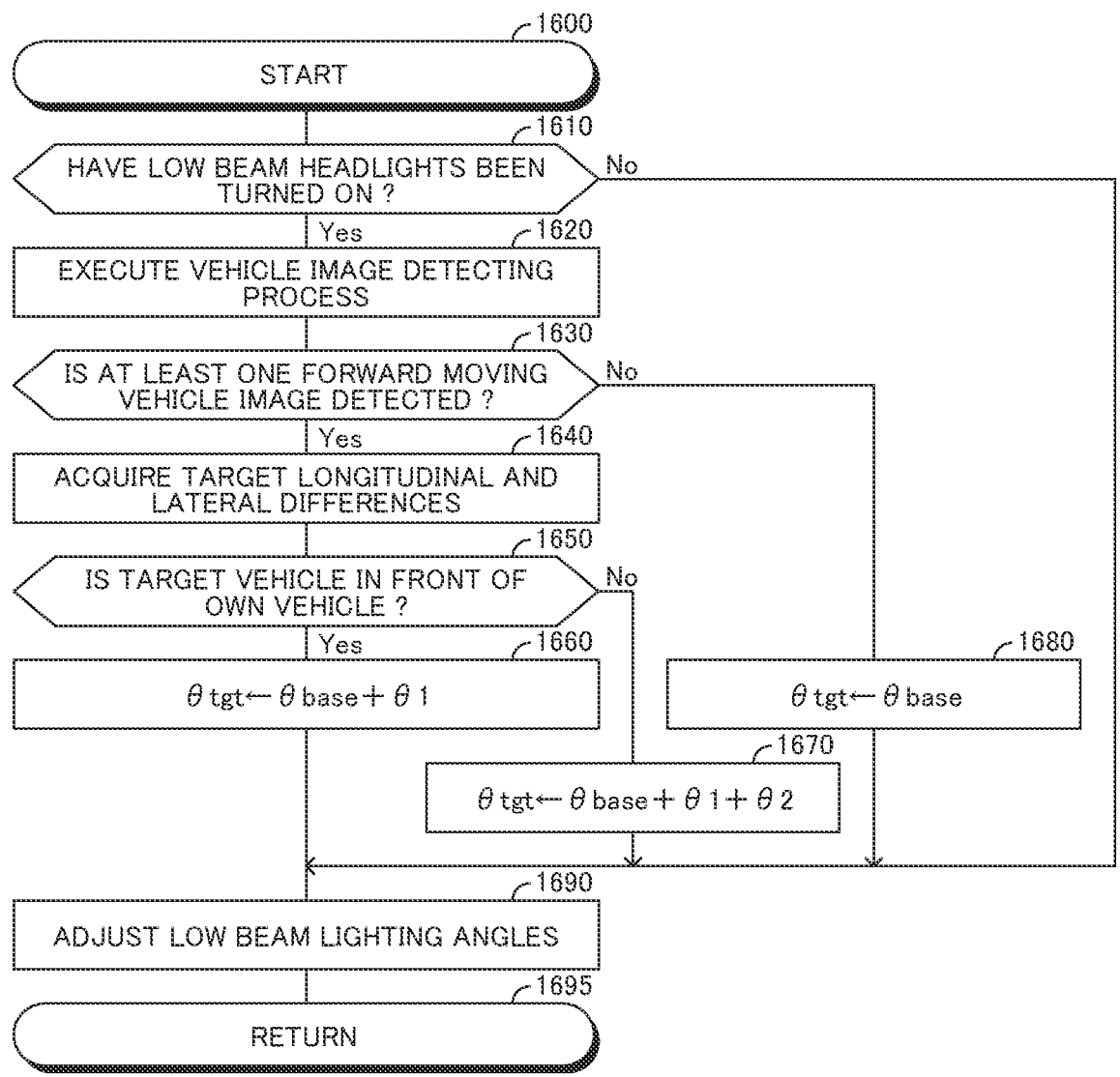
FIG. 16 is a view which shows a flowchart of a routine executed by the headlight control apparatus according to the embodiment of the invention.

In addition, the CPU is configured or programmed to execute a routine shown in FIG. 16 each time the predetermined calculation time elapses. Thus, at a predetermined time, the CPU starts to execute a process from a step 1600 of the routine shown in FIG. 16 and proceeds with the process to a step 1610 to determine whether the low beam headlights 21L have been turned on.

When the CPU determines "Yes" at the step 1610, the CPU proceeds with the process to a step 1620 to execute the vehicle image detecting process of detecting the forward moving vehicle images IM_200F from the forward image IM_F. Next, the CPU proceeds with the process to a step 1630 to determine whether at least one forward moving vehicle image IM_200F is detected by the vehicle image detecting process executed at the step 1620.

When the CPU determines "Yes" at the step 1630, the CPU proceeds with the process to a step 1640 to set the target vehicle 200T from among the at least one forward moving vehicles 200F represented by the at least one forward moving vehicle image IM_200F detected at the step 1620, and acquire the target longitudinal difference dx_T and the target lateral difference dy_T of the target vehicle 200T. Next, the CPU proceeds with the process to a step 1650 to determine whether the target vehicle 200T is a vehicle which is directly in front of the own vehicle 100, based on the target lateral difference dy_T.

When the CPU determines "Yes" at the step 1650, the CPU proceeds with the process to a step 1660 to (i) acquire the first angle •1, based on the target longitudinal difference dx_T, (ii) acquire a value by adding the first angle •1 to the base lighting angle •base, and (iii) set the acquired angle as the target lighting angle •tgt. Next, the CPU proceeds with the process to a step 1690 to adjust the low beam lighting angles •low to the target lighting angle •tgt set at the step 1660 by actuating the headlight actuators 22. Thereby, the optimum lighting area Aopt is illuminated by the low beam headlights 21L.

Next, the CPU proceeds with the process to a step 1695 to terminate executing this routine once.

On the other hand, when the CPU determines "No" at the step 1650, the CPU proceeds with the process to a step 1670 to (i) acquire the first angle •1, based on the target longitudinal difference dx-T, (ii) set the cut-off angle •cutoff as the second angle •2, (iii) acquire an angle by adding the first angle •1 and the second angle •2 to the base lighting angle •base, and (iv) set the acquired angle as the target lighting angle •tgt. Next, the CPU proceeds with the process to a step 1690 to adjust the low beam lighting angles •low to the target lighting angle •tgt set at the step 1670 by activating the headlight actuators 22. Thereby, the optimum lighting area Aopt is illuminated by the low beam headlights 21L.

Next, the CPU proceeds with the process to the step 1695 to terminate executing this routine once.

When the CPU determines "No" at the step 1630, the CPU proceeds with the process to a step 1680 to set the base lighting angle •base as the target lighting angle •tgt. Next, the CPU proceeds with the process to the step 1690 to adjust the low beam lighting angles •low to the target lighting angle •tgt set at the step 1680 by activating the headlight actuators 22. Thereby, the optimum lighting area Aopt is illuminated by the low beam headlights 21L.

Next, the CPU proceeds with the process to the step 1695 to terminate executing this routine once.

When the CPU determines "No" at the step 1610, the CPU proceeds with the process directly to the step 1695 to terminate executing this routine once.

The specific operations of the headlight control apparatus 10 have been described.

It should be noted that the invention is not limited to the aforementioned embodiments, and various modifications can be employed within the scope of the invention.

For example, when the preceding vehicle 201 and the next lane vehicle 203 move ahead of the own vehicle 100 as shown in FIG. 17B, and the low beam lighting angles •low are adjusted to the target lighting angle •tgt set as described above, the light from the low beam headlights 21L may illuminate the preceding vehicle 201 due to a relationship in position between the preceding vehicle 201 and the next lane vehicle 203 as shown in FIG. 17B. In this case, the driver of the preceding vehicle 201 may be dazzled.

Accordingly, the headlight control apparatus 10 may be configured to set the forward moving vehicle 200F which the light from the low beam headlight 21L lights, as the target vehicle 200T when (i) the images IM_200F of the forward moving vehicles 200F are detected by the vehicle image detecting process, (ii) the forward moving vehicle 200F which has the shortest longitudinal difference dx is set as the target vehicle 200T, and (iii) the light from the low beam headlights 21L predictively lights any of the remaining forward moving vehicles 200F.

What is claimed is:

1. A headlight control apparatus, comprising:
an electronic control unit which executes a lighting angle control of adjusting a lighting angle of at least one headlight of an own vehicle; and
a forward image acquiring device which acquires a forward image which is an image of a view ahead of the own vehicle,
wherein the electronic control unit is configured to:
execute a vehicle image detecting process of detecting an image of a forward moving vehicle ahead of the own vehicle from the forward image when the electronic control unit executes the lighting angle control;
when the electronic control unit detects the image of the forward moving vehicle by the vehicle image detecting process, set the forward moving vehicle identified by the detected image of the forward moving vehicle as a target vehicle which the lighting angle control targets;
acquire a target longitudinal difference which corresponds to a length between a reference lateral line and a target vehicle lateral line, the reference lateral line being a reference line which extends in a lateral direction in the forward image, the target vehicle lateral line being a line which extends in the lateral direction in the forward image and defines a position of the target vehicle in a longitudinal direction in the forward image;
acquire a target lateral difference which corresponds to a length between a reference longitudinal line and a target vehicle longitudinal line, the reference longitudinal line being a reference line which extends in the longitudinal direction in the forward image, the target vehicle longitudinal line being a line which extends in the longitudinal direction in the forward image and defines a position of the target vehicle in the lateral direction in the forward image;
set a target lighting angle of the at least one headlight, depending on the acquired target longitudinal difference and the acquired target lateral difference; and
adjust the lighting angle of the at least one headlight to the set target lighting angle.

2. The headlight control apparatus as set forth in claim 1, wherein when the electronic control unit detects the images of the forward moving vehicles from the forward image, the electronic control unit is configured to set the forward moving vehicle closest to the own vehicle as the target vehicle among the forward moving vehicles identified by the images of the forward moving vehicle.

3. The headlight control apparatus as set forth in claim 1, wherein
the electronic control unit is configured to:
when the electronic control unit does not detect the image of the forward moving vehicle, set a predetermined base lighting angle as the target lighting angle; and
when the electronic control unit detects the image of the forward moving vehicle, and sets the target vehicle, (i) acquire a first angle to be added to the predetermined base lighting angle, based on the target longitudinal difference, (ii) acquire a second angle to be added to the predetermined base lighting angle, based on the target lateral difference, and (iii) set a value acquired by adding the first angle and the second angle to the predetermined base lighting angle as the target lighting angle.

4. The headlight control apparatus as set forth in claim 3, wherein:
the at least one headlight includes an oncoming lane area headlight which lights an area at an oncoming lane side and a forward area headlight which lights an area directly in front of the own vehicle;
the lighting angle of the oncoming lane area headlight is smaller than the lighting angle of the forward area headlight by a predetermined angle; and
the electronic control unit is configured to:
set the second angle to zero when the target vehicle is a vehicle moving in the area directly in front of the own vehicle; and
set the second angle to the predetermined angle when the target vehicle is a vehicle moving in the area at the oncoming lane side.

5. The headlight control apparatus as set forth in claim 4, wherein the electronic control unit is configured to:
when the target lateral difference represents the area directly in front of the own vehicle with respect to the reference longitudinal line, determine that the target vehicle is the vehicle moving in the area directly in front of the own vehicle; and
when the target lateral difference represents the area at the oncoming lane side with respect to the reference longitudinal line, determine that the target vehicle is the vehicle moving in the area at the oncoming lane side.

6. The headlight control apparatus as set forth in claim 1, wherein the reference lateral line is a line which defines a position of a front edge of the area ahead of the own vehicle which the at least one headlight light with a predetermined base lighting angle.

* * * * *